(12) United States Patent
Kuznetsov

(10) Patent No.: US 12,308,782 B1
(45) Date of Patent: May 20, 2025

(54) DYNAMICALLY STABILIZED HYBRID ENERGY STORAGE MACHINERY FOR POWER SYSTEM EXPERIENCING TORSIONAL OSCILLATIONS

(71) Applicant: Raytheon Company, Tewksbury, MA (US)

(72) Inventor: Stephen B. Kuznetsov, Marlborough, MA (US)

(73) Assignee: Raytheon Company, Arlington, VA (US)

( * ) Notice: Subject to any disclaimer, the term of this patent is extended or adjusted under 35 U.S.C. 154(b) by 0 days.

(21) Appl. No.: 18/602,913

(22) Filed: Mar. 12, 2024

(51) Int. Cl.
*H02P 9/10* (2006.01)
*H02P 103/10* (2016.01)

(52) U.S. Cl.
CPC .......... *H02P 9/105* (2013.01); *H02P 2103/10* (2015.01)

(58) Field of Classification Search
CPC ............................. H02P 9/105; H02P 2103/10
See application file for complete search history.

(56) References Cited

U.S. PATENT DOCUMENTS

| | | | |
|---|---|---|---|
| 3,474,323 | A | 10/1969 | Kilgore et al. |
| 3,999,115 | A | 12/1976 | South et al. |
| 4,454,428 | A | 6/1984 | Kimmel et al. |
| 11,038,398 | B2 | 6/2021 | Kuznetsov |
| 2024/0372499 | A1 | 11/2024 | Kuznetsov |

FOREIGN PATENT DOCUMENTS

SE 542481 C2 * 5/2020 ............. H02K 16/04

OTHER PUBLICATIONS

Notice of Allowance dated Jan. 17, 2025 in connection with U.S. Appl. No. 18/602,889, 13 pages.

* cited by examiner

*Primary Examiner* — Viet P Nguyen

(57) ABSTRACT

A hybrid asynchronous induction machine includes a stator disposed in a stator housing, the stator comprising an input winding for a polyphase input signal, a primary output winding and a secondary output winding. The machine also includes a rotor having a shaft connected to a flywheel of an energy storage unit. The rotor comprises a primary rotor winding for a polyphase AC excitation signal and a secondary rotor winding for bidirectional power flow. The hybrid asynchronous induction machine is further configured to receive a compensation signal for cancelling low-frequency electrical resonances.

20 Claims, 18 Drawing Sheets

DYNAMICALLY STABILIZED HYBRID ENERGY STORAGE MACHINERY FOR POWER SYSTEM EXPERIENCING TORSIONAL OSCILLATIONS

TECHNICAL FIELD

This disclosure relates generally to electric power generation and buffering electrical power supplies. More specifically, this disclosure relates to dynamically stabilized hybrid energy storage machinery for a power system experiencing torsional oscillations.

BACKGROUND

When interposed between a primary AC generator (for example, a turbine generator) and apparatus creating large, pulsed current loads, induction machines with hybrid (for example, kinetic and electrical) energy storage units can provide a buffer to prevent sagging and variation in AC power supplied to the apparatus across wide range of frequencies being propagated back to the primary AC rotating generator which may cause unwanted mechanical resonances in the primary AC generator. However, even when an asynchronous induction machine is used, pulsed loads can induce low-frequency electric resonances which, when propagated, cause torsional oscillations of spinning components (for example, turbine shafts) of the electrical generator.

SUMMARY

This disclosure relates to a dynamically stabilized hybrid energy storage machinery for a power system experiencing torsional oscillations.

In a first embodiment, a method of stabilizing an electric power supply includes receiving, at a controller connected to an alternating current (AC) excitation source, a plurality of system inputs. The plurality of system inputs include a value of an electrical frequency ($f_0$) on a main bus from a primary AC generator; a value of an electrical frequency ($f_1$) at an output port of a stator of a hybrid asynchronous induction machine, wherein the hybrid asynchronous induction machine comprises a rotor configured to provide and receive inertial energy to and from a flywheel of an energy storage unit (ESU); a value of a shaft speed of the flywheel of the ESU; a value of an input power to the hybrid asynchronous induction machine; and a value of an output power at the output port to one or more apparatus drawing a load current. The method further includes obtaining a harmonic spectrum of the load current, and determining based on the harmonic spectrum, a first low frequency spectrum of the load current with a greatest magnitude of oscillations. Additionally, the method includes controlling the AC excitation source to generate a first compensation signal and providing the first compensation signal to the hybrid asynchronous induction machine for enhancing the magneto-motive force of the magnetic circuit. One or more waveform properties of the first compensation signal is based on at least one of: the value of the electrical frequency ($f_0$) on the main bus from the primary AC generator; the value of the electrical frequency ($f_1$) of the output port of the stator of the hybrid asynchronous induction machine; the value of the shaft speed of the flywheel of the ESU; and the value of the input power to the hybrid asynchronous induction machine.

In a second embodiment, an apparatus for dynamically stabilizing an electric power supply includes a controller. The controller can be configured to receive a plurality of system inputs. The plurality of system inputs can include a value of an electrical frequency ($f_0$) on a main bus from a primary alternating current (AC) generator; a value of an electrical frequency ($f_2$) of an output of an output port of a stator of a hybrid asynchronous induction machine, wherein the hybrid asynchronous induction machine comprises a rotor configured to provide and receive inertial energy to and from a flywheel of an energy storage unit (ESU); a value of a shaft speed of the flywheel of the ESU; a value of an input power to the hybrid asynchronous induction machine; and a value of an output power at the output port to one or more apparatus drawing a load current. The controller is further configured to obtain a harmonic spectrum of the load current, and determine, based on the harmonic spectrum, a first low frequency spectrum of the load current with a greatest magnitude of oscillations. The controller can be configured to control an AC excitation source to generate a first compensation signal and provide the first compensation signal to the hybrid asynchronous induction machine for enhancing the magneto-motive force of the excitation circuit. One or more waveform properties of the first compensation signal is based on one or more of the value of the electrical frequency ($f_0$) on the main bus from the primary AC generator; the value of the electrical frequency ($f_2$) of the output port of the stator of the hybrid asynchronous induction machine; the value of the shaft speed of the flywheel of the ESU; and the value of the input power to the hybrid asynchronous induction machine.

In a third embodiment, a hybrid asynchronous induction machine, includes a stator housing. There can be a stator disposed in the stator housing, in which the stator includes an input winding for a polyphase AC input power signal, the input winding comprising a plurality of phase windings, wherein each phase winding of the input winding is connected to a first auxiliary port for the input winding and a tap is provided for a compensation signal. The stator also includes a primary output winding for a first polyphase AC output signal, the primary output winding comprising phase windings in a higher or equal number as the plurality of phase windings of the input winding, wherein each phase winding of the primary output winding is connected to a second auxiliary port for powering a pulsed load. The stator includes a secondary output winding for a second polyphase AC output signal, the secondary output winding comprising phase windings in a higher or equal number of phases as the plurality of phase windings of the input winding, wherein each phase winding of the secondary output winding is connected to a third auxiliary port for powering a second pulsed load. The hybrid asynchronous induction machine includes a rotor having a shaft and disposed to rotate within a magnetic field of the input winding, the primary output winding, and the secondary output winding, wherein the shaft is connected to a flywheel of an energy storage unit. The rotor includes a primary rotor winding for a polyphase AC excitation signal, the primary rotor winding comprising phase windings in the same number of poles as the plurality of phase windings of the input winding, wherein each phase winding of the primary rotor winding is connected to one or more primary slip rings on the shaft. The rotor also includes a secondary rotor winding for bidirectional power flow, the secondary rotor winding comprising phase windings in the same or higher number of poles as the plurality of phase windings of the input winding, wherein each phase winding of the secondary rotor winding is connected to one or more secondary slip rings for current oscillation on the shaft. The hybrid asynchronous induction machine is configured to receive a compensation signal for cancelling low-frequency electrical resonances.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
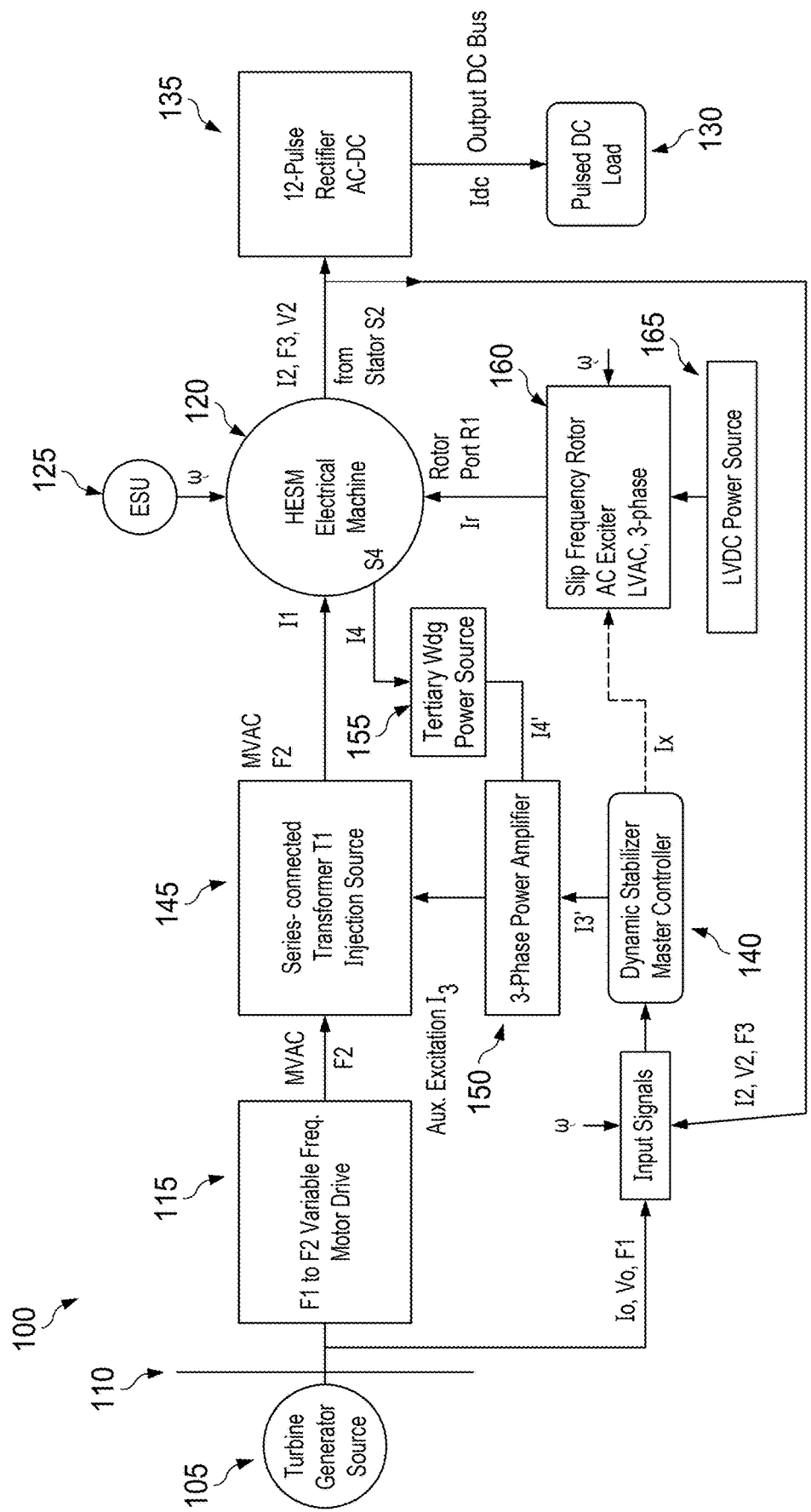
FIGS. 1 through 4 illustrate example systems utilizing dynamic stabilization of a hybrid asynchronous induction machine.

FIGS. 1 through 12, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

The quality of alternating current (AC) power, both in terms of reliability and minimization of noise and other deviations from purely sinusoidal waveforms, supplied from a turbine generator or other primary AC generator to large, pulsed electrical loads can be significantly enhanced by interposing a hybrid induction machine which can draw upon both stored kinetic energy (stored in a flywheel) or electrical energy (for example, stored in a supercapacitor) between the pulsed load and turbine generator. Such induction machines comprise a stator with a plurality of ports, including one or more ports which receive AC input power from one or more conditioning apparatus (for example, a variable motor drive to set the frequency of the AC input power) driven by a primary AC generator and an output port connected to one or more electrical loads. The motion of a wound rotor with a controllable AC excitation current through the magnetic field between the stator and rotor induces an AC current at the output port of the stator. Thanks to the facts that: a.) in contrast to synchronous electrical machines, in which the waveform properties (notably, the frequency of the output waveform) are necessarily linked to the rotational speed of the rotor; and b.) the stored kinetic energy in the flywheel is available to drive the rotor through the magnetic field between the rotor, such hybrid induction machines can dynamically buffer, or isolate turbine generators from mechanical stresses arising due to the large and rapidly changing variations in electrical load across a wide range of frequencies. However, even with a hybrid induction machine, large, pulsed loads can induce low frequency resonances in the hybrid induction machine, which can be propagated back to the primary AC power generator and cause torsional oscillations in rotating components of the AC power generator (for example, turbine shafts) at low frequencies.

U.S. Pat. No. 11,038,398, the contents of which are incorporated by reference in its entirety, illustrates examples of induction machines, and methods and apparatus for stabilizing pulsed-load induced mechanical oscillations in the context of applications in which a power supply is buffered by synchronous hybrid induction machines. U.S. Pat. No. 11,632,021 the contents of which are incorporated by reference in their entireties, illustrate examples of either synchronous or asynchronous induction machines, and methods and apparatus for stabilizing pulsed-load induced mechanical oscillations in the context of applications in which a power supply is buffered by hybrid type of electrical machines.

This disclosure provides a controller for generating an AC excitation signal which is 180 degrees out of phase with one or more major low frequency components of a pulsed load and injecting the AC excitation signal into a power generation network comprising a turbine generator and an asynchronous hybrid induction machine, thereby canceling out the electrical source of low frequency torsional oscillations in a turbine generator or other rotational electrical power generation apparatus. Put differently, this disclosure provides apparatus and methods for expanding the bandwidth of an asynchronous hybrid induction machine as a buffer between widely varying electrical loads and the mechanicals of the turbine or other power generation apparatus. This disclosure also provides an asynchronous hybrid induction machine with a stator adapted for generating a low-frequency auxiliary excitation signal to further buffer a turbine generator from torsional oscillations excited by large, pulsed electrical loads at the output of the asynchronous hybrid induction machine.

FIGS. 1 through 4 illustrate an example systems in which a hybrid asynchronous induction machine is dynamically stabilized, according to embodiments of this disclosure. For consistency and in convenience of cross-reference, elements common to more than one of FIGS. 1 through 4 are numbered similarly.

As shown in FIGS. 1 through 4, a powered system 100 can comprise a primary AC generator 105, which uses kinetic energy to drive a stator through an electromagnetic field to generate polyphase AC power at an output frequency F1. Primary AC generator 105 can be, without limitation a gas, steam or wind turbine apparatus. The output of primary AC generator 105 can be fed to a main bus, which provides power at a specified voltage at output frequency F1. A variable frequency motor drive 115 draws power from main bus 110 and changes the frequency to a variable frequency F2, wherein F2 varies in response to loads and stored energy of the hybrid asynchronous induction machine 120. Variable frequency motor drive 115 can feed an induction motor, in which the change from input frequency F1 to output frequency F2 can be effected by actively modulating the slip frequency of the motor. By regulating its own output frequency F2 in addition to the slip frequency modulation, motor drive 115 can establish and control the frequency of electricity provided at the output of hybrid asynchronous induction machine 120.

Hybrid asynchronous induction machine 120 comprises an induction generator with a stator and rotor and one or more electrical ports connected to windings of the induction machine (for example, polyphase stator ports S1, S2 and S4 and polyphase rotor port R1). Hybrid asynchronous induction machine 120 is configured to receive a variable frequency main input power at a stator port (for example, stator port S1) at variable frequency F2, wherein variable frequency F2 is regulated by motor drive 115. Hybrid asynchronous induction machine 120 further comprises, or is connected to, an energy storage unit (ESU) 125, which comprises a flywheel in which kinetic energy is stored, and wherein kinetic energy can be added to, or subtracted from, the ESU from hybrid asynchronous induction machine 120. The flywheel of ESU 125 spins and can be driven at a rate proportional to frequency F2. In some embodiments, connection between the flywheel of ESU 125 can be achieved by having the rotor windings of hybrid asynchronous induction machine 120 rotate on a common shaft. Alternatively, the flywheel may be connected to the hybrid asynchronous induction machine through a step-up gearbox.

In response to spikes, surges or pulses in the electrical load at stator port S2, ESU 125 discharges inertial energy into hybrid asynchronous induction machine 120, causing the speed of the flywheel of ESU 125 to drop. Subsequently, input frequency F2 is increased to increase the driving force on the flywheel of ESU 125 and restore the buffer of kinetic energy in ESU 125.

By rapidly dumping kinetic energy from ESU 125 into hybrid asynchronous induction machine 120, large, stochastic variations in electrical loads powered by stator port S2 of hybrid asynchronous induction machine 120 have minimal effect on the current I1 which primary AC generator 105 and motor drive 115 provide to input port S1 of hybrid asynchronous induction machine 120. As such, hybrid asynchronous induction machine 120 generally buffers primary AC generator 105 from the load swings arising at the output port S2, thereby protecting primary AC generator 105 and other electrical components upstream from hybrid asynchronous induction machine 120 from stresses (mechanical and electrical) arising from large fluctuations in the load drawn at output port S2. In some embodiments, hybrid asynchronous induction machine 120 has bidirectional power flow in all stator and rotor ports.

However, testing has shown that the current drawn by certain large, pulsed DC loads 130 (for example, radar sets) powered by a rectified power supply (for example, low voltage-direct current pulse rectifier) can create electrical resonances within hybrid asynchronous induction machine 120 at low-frequencies (for example, less than 150 Hz) which can affect current I1, and in turn, be propagated upstream, potentially causing destructive low-frequency vibrations and torsional oscillations in motor drive 115 and primary AC generator 105. Even if not necessarily destructive to upstream apparatus such as, primary AC generator 105, such induced torsional oscillations are undesirable. The low frequency of the induced resonances at hybrid asynchronous induction machine 120 and the associated torsional oscillations at one or more of motor drive 115 and primary AC generator is such that traditional electric and electronic filtering techniques (for example, RC filtering) can be ineffective in suppressing the resonances at hybrid asynchronous induction machine 120 to the extent necessary to prevent torsional oscillation at primary AC generator 105 and other upstream components of system 100.

As discussed herein, and with reference to FIGS. 1-4, certain embodiments according to this disclosure can eliminate unwanted torsional oscillations at apparatus on the generation side (i.e., along the electrical path between primary AC generator 105 and an input port of hybrid asynchronous induction machine 120) due to pulses or other large swings in electrical load on the output side (for example, pulsed load 130) on the output side of hybrid asynchronous induction machine 120, by identifying frequencies of concern and injecting one or more compensation signal(s) on the generation side of hybrid asynchronous induction machine 120. The compensation signal(s) are of substantially similar magnitude and 180 degrees out of phase with the resonances of concern, and by the principle of superposition, operate to cancel out one or more of the low-frequency resonances at hybrid asynchronous induction machine 120, and, by implication, prevent such resonances from causing unwanted torsional oscillations at upstream apparatus on the generation side of hybrid asynchronous induction machine 120. In this way, certain embodiments according to the present disclosure help optimize the galvanic isolation between the input and output ports of hybrid asynchronous induction machine 120.

Referring to the illustrative example of FIG. 1, the spectral properties (for example, phases, frequency and amplitude) of the one or more compensation signals to be injected on the generation side of hybrid asynchronous induction machine 120 are determined by a stabilizer controller 140. Stabilizer controller 140 can be a controller having a processor, a non-transitory memory with program code which can be executed by the processor, and an input/output functionality for communicating with other apparatus within system 100. Additionally, or alternatively, controller 140 can be implemented without a processor, as analog control circuitry. Controller 140 is adaptive and can compensate for load-induced low-frequency oscillations that are stochastic in nature.

To determine the spectral properties of the one or more compensation signals for cancelling unwanted electrical resonances within hybrid asynchronous induction machine 120, controller 140 can receive the following inputs:

Frequency F1 of an alternating current provided by primary AC generator 105

Frequency F3 of an alternating current at a stator port (for example, stator port S2) of hybrid asynchronous induction machine 120

A shaft speed $\varphi$ of the flywheel of ESU 125

An input power to an injection source disposed on the generation side of hybrid asynchronous induction machine 120. This input power can be determined based on the current $I_0$ and voltage $V_0$ measured along the electrical path between primary ac generator 105 and hybrid asynchronous induction machine 120. In the illustrative example of FIG. 1, the input power can be measured at series-connected transformer T1, which is disposed between motor drive 115 and hybrid asynchronous induction machine 120.

An output power from a port (for example, stator port S2) on the output side of hybrid asynchronous induction machine 120. In the illustrative example of FIG. 1, the output power can be measured based on values of current (I2) and voltage (V2) at the output port.

Having received the above-described inputs, controller 140 obtains a representation of the harmonic spectrum of the AC load current (I2 in FIG. 1) to pulsed load 130. In this example, controller 140 obtains the harmonic spectrum of the AC load current by performing a Fast Fourier Transform (FFT) of the current at the output port of hybrid asynchronous induction machine 120. Based on the harmonic spectrum of the AC load current, controller 140 determines one or more low frequencies of the AC load current which present oscillations in the load current of the greatest magnitude. As used in this disclosure, the expression "low frequencies" encompasses frequencies of 150 Hz or less. Thereafter, controller 140 determines, based on the received inputs, the spectral properties (i.e., frequency, phase, and amplitude) of one or more compensation signals for quelling the unwanted low-frequency electrical resonances induced in hybrid asynchronous induction machine 120 by the variable electrical load (for example, pulsed DC load 130) at an output port of the hybrid asynchronous induction machine 120.

Controller 140 controls one or more injection sources to generate and provide the determined one or more compensation signals at one or more points on the generation side of hybrid asynchronous induction machine 120. The present disclosure contemplates and encompasses a plurality of options as to where, within system 100, the one or more compensation signals can be injected to inhibit electrical resonances within hybrid asynchronous induction machine 120.

In some embodiments, the one or more compensation signals can be injected into the system by a power amplifier 150 connected to an injection source 145 (for example, a series connected transformer). Consistent with the overall architectural goals of system 100, including galvanically isolating primary AC generator 105 from large fluctuations in electrical load at output ports of hybrid asynchronous induction machine 120, the series-connected transformer operating as injection source 145 can include a high-impedance primary winding (receiving a modulating signal from power amplifier 150) and a low-impedance secondary winding (connected in series to an input port of hybrid asynchronous induction machine 120).

As shown in FIG. 1, power amplifier 150 can be a polyphase (for example, three-phase) power amplifier. Power amplifier 150 generates (for example, by amplifying a control signal from controller 140 by a predetermined amount) the one or more compensation AC signals and inject same into a tap or transformer coupling action to an injection source 145. In this example, injection source 145 can be the high impedance winding of a series connected transformer. Additionally, in some embodiments, power amplifier 150 can be powered by a tertiary winding 155 on the stator of hybrid asynchronous induction machine 120.

Figure 3:
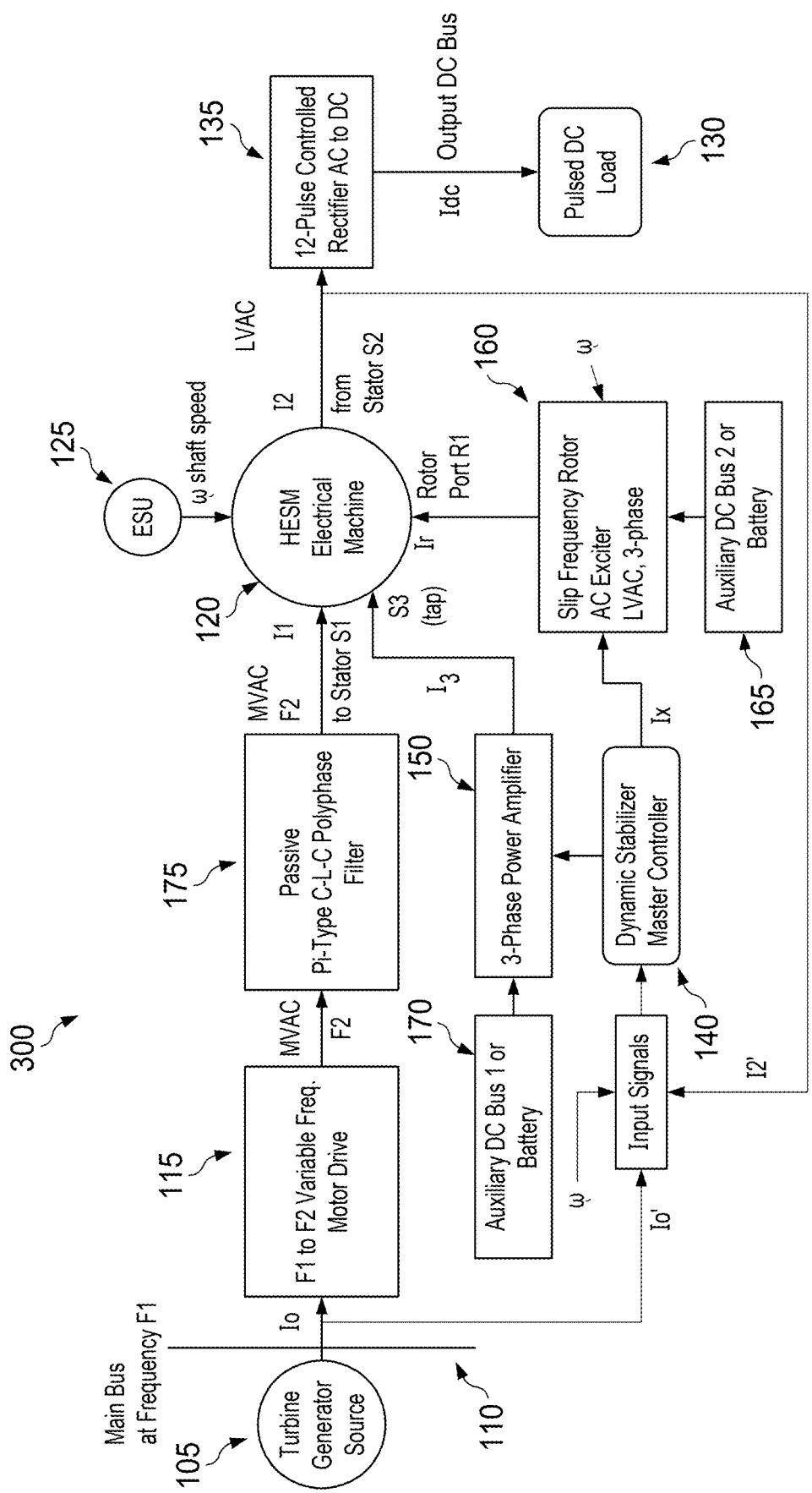
Figure 4:
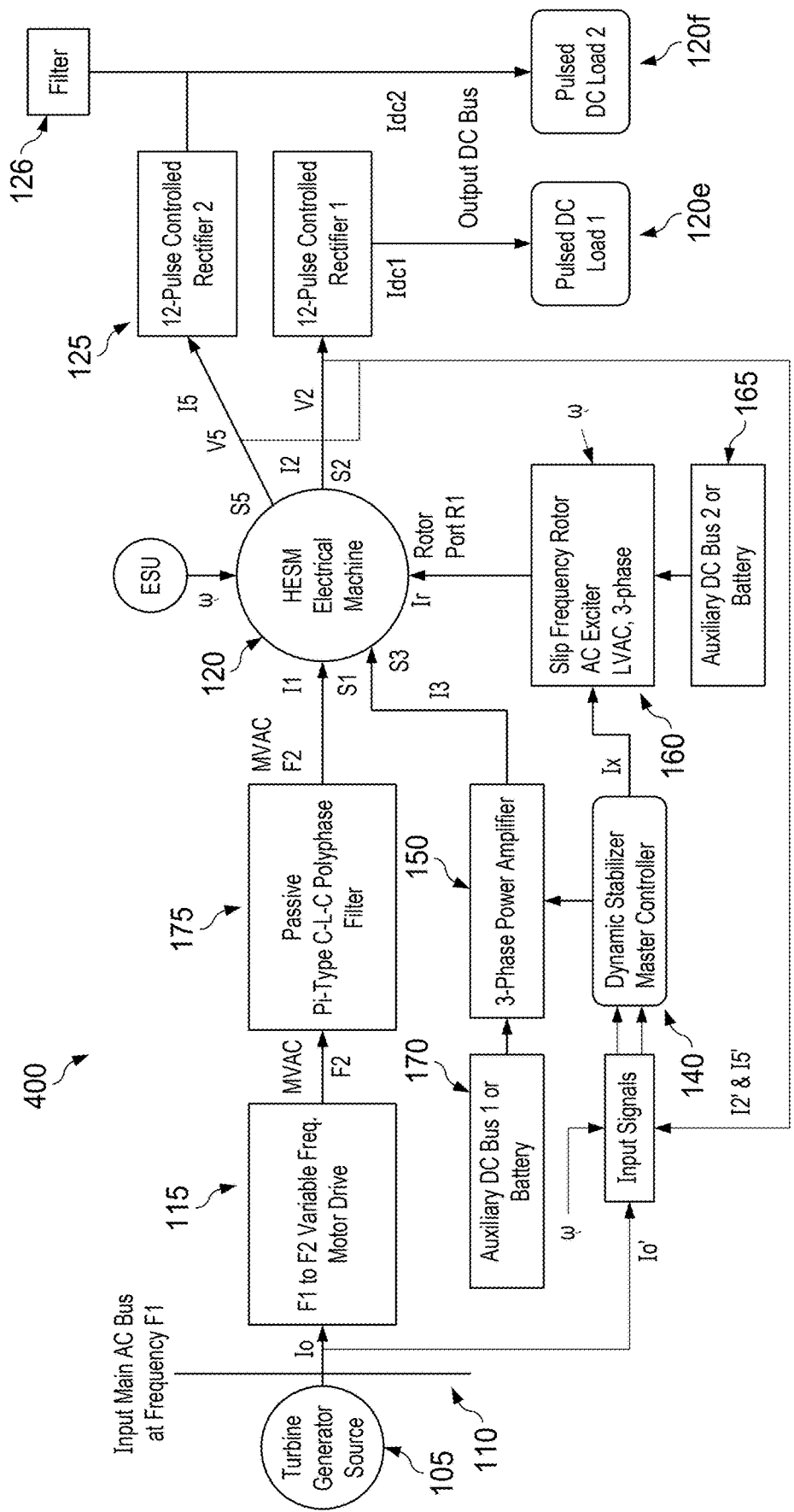

Additionally, or alternatively, in some embodiments, power amplifier 150 can operate as an AC excitation source for injecting the one or more compensation signals into hybrid asynchronous induction machine 120 by providing the one or more correction signals directly to a port of the stator of hybrid asynchronous induction machine 120, as shown in the example of FIG. 3. In some embodiments, hybrid asynchronous induction machine 120 does not have a permanent magnetic field, or any other form of self-magnetization, an AC excitation current must be provided to the rotor for hybrid asynchronous induction machine 120 to operate. Accordingly, in such embodiments as shown in FIGS. 3 and 4, in addition to determining the waveform parameters of the one or more compensation signals injected into hybrid asynchronous induction machine 120, controller 140 can also regulate the slip frequency of hybrid asynchronous induction machine 120. Rotor exciter 160 can be a polyphase (for example, three-phase) DC-AC inverter, which is fed from a power source 165. Depending on embodiments, power source 165 is a DC power source for example, a battery which is decoupled or otherwise buffered from primary AC generator 105. To mitigate any risk of the one or more compensation signals affecting the primary frequency of the output of hybrid asynchronous induction machine 120, controller 140 can provide active control of the slip frequency and slip voltage/current of hybrid asynchronous induction machine 120. In this way, the major operation of hybrid asynchronous induction machine 120 can be regulated by controller 140.

Figure 2:
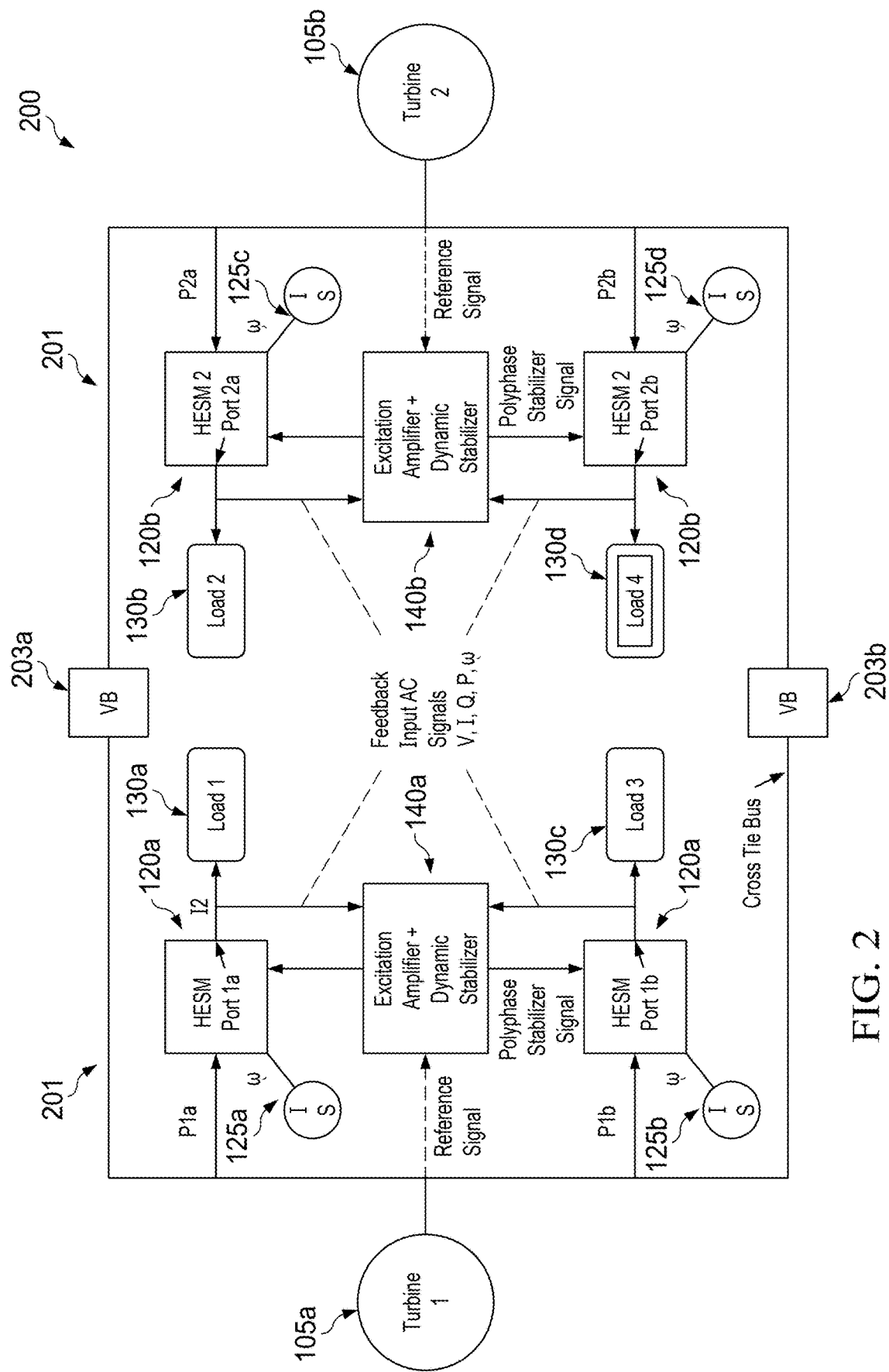

FIG. 1 illustrates one example of a system 100 in which unwanted resonances in a hybrid asynchronous induction machine caused by pulsed or highly dynamic electrical loads can be suppressed by injecting compensation signals on the generation side of the induction machine through the use of a series-injection transformer. FIGS. 2-4 provide a non-exhaustive set of alternative configurations to illustrate how the example of FIG. 1 can be extended to systems with one or more primary AC generators, hybrid asynchronous induction machines, energy storage units (ESUs) or pulsed loads.

Referring to the illustrative example of FIG. 2, a second example system 200 is shown, wherein the power generation architecture described with reference to system 100 of FIG. 1 is scaled. In this example, system 200 comprises first primary AC generator 105*a*, and second primary AC generator 105*b*, which, like primary AC generator 105 in FIG. 1, can be, without limitation a gas, steam or wind turbine apparatus. The output of primary AC generator 105 can be fed to a main bus 201, which provides power at a specified voltage at output frequency. Depending on the architecture, main bus 201 can include one or more vacuum circuit breakers 203*a*-203*b* for selectively connecting and disconnecting primary AC generators 105*a* and 105*b* from main bus 201.

As shown in FIG. 2, system 200 further comprises a first hybrid asynchronous induction machine 120*a* and a second hybrid asynchronous induction machine 120*b*. Hybrid asynchronous induction machines 120*a* and 120*b* comprise wound-field induction generators, each having a stator and rotor and a plurality of ports connected to the stator and rotor (for example, a plurality of stator ports, and at least one rotor port. In the example of FIG. 2, each of first and second hybrid asynchronous induction machines 120*a* and 12*b* is configured to receive a variable frequency main input power at a stator port (for example, stator port S1) at variable frequency F2, wherein variable frequency F2 is regulated by motor drive 115. In this example, two of the stator output ports (designated as "Port 1*a*, Port 1*b*, Port 2*a* and Port 2*b*") of each of hybrid asynchronous induction machines 120*a* and 120*b* are shown in the figure. In this example, each of first and second hybrid induction machines is shown as drawing a reference signal from main bus 201. As discussed elsewhere in this disclosure, the output frequency and variability of the AC current provided at the output ports of first and second hybrid asynchronous induction machines 120*a* and 120*b* is, while not as tightly linked as in a synchronous electrical machine, still dependent on the frequency and variability of the AC current provided to the input ports of the induction machines. As such, each of first and second asynchronous induction machines 120*a* and 120*b* is fed an AC reference signal whose frequency is close to the desired output frequency for each of the first and second induction machines.

In embodiments in which the desired output frequency from the induction machines differs from that of main bus 201, or the AC signal on main bus exhibits impermissible variability (i.e., is too noisy), desired frequency or noise characteristics of the reference signals to be fed to the induction machines can be obtained by interposing frequency-change apparatus (for example, motor drive 115 in FIG. 1) and/or filtering apparatus (for example, active or passive polyphase filters) between main bus 201 and each of first and second hybrid asynchronous induction machines 120a and 120b. Additionally, each of first and second hybrid asynchronous induction machines comprise or are connected to one or more energy storage units (ESU) 125a, 125b, 125c and 125d. Each ESU 125 comprises a flywheel in which kinetic energy is stored, and wherein kinetic energy can be added to the ESU from the hybrid asynchronous induction machine to which it is connected.

Each port of first and second hybrid asynchronous induction machines 120a and 120b is connected to one of loads 130a, 130b, 130c and 130d. These four loads can be of different electrical time constants and of different voltage and power levels. Like load 130 in FIG. 1, loads 130a-d can be large, dynamic and capable of inducing electrical resonances in first and second hybrid asynchronous induction machines 120a and 120b in low frequencies outside of the bandwidths which can foreseeably be suppressed through the action of ESUs 125a-125d unloading kinetic energy into the induction machines which they serve.

System 200 comprises first and second controllers 140a and 140b, which, similar to their counterpart controller 140 in FIG. 1, receive the following inputs for identifying controlling an excitation amplifier (shown as part of controllers 140a and 140b) to provide one or more compensation signals on the generation sides of first and second hybrid asynchronous induction machines:

| Input Signals Received at First Controller 140a | Input Signals Received at Second Controller 140b |
| --- | --- |
| A frequency of AC current along main bus 201 | A frequency of AC current along main bus 201 |
| A frequency of a reference signal provided to an input port of first asynchronous hybrid induction machine 120a. | A frequency of a reference signal provided to an input port of first asynchronous hybrid induction machine 120b. |
| One or more shaft speeds of the flywheels of ESU 125a, 125b. | One or more shaft speeds of the flywheels of ESU 125c, 125d. |
| An input power (for example, the voltage and current of the reference signal) at the input port of first hybrid asynchronous induction machine 120a. | An input power (for example, the voltage and current of the reference signal) at the input port of second hybrid asynchronous induction machine 120b. |
| An output power at each port of first hybrid asynchronous induction machine 120a. | An output power at each port of second hybrid asynchronous induction machine 120b. |

Based on the above inputs, each of first controller 140a and second controller 140b obtains one or more harmonic spectra of the pulsed loads being driven by the output ports of the hybrid asynchronous induction machine to which it is connected. The one or more harmonic spectra can be obtained, for example, by taking a Fast Fourier Transform (FFT) of the current(s) drawn at each output port of each hybrid asynchronous induction machine. Based on the harmonic spectra of the one or more loads, each of first controller 140a and second controller 140b determine, for each of the loads drawn by the hybrid asynchronous induction machine under their control, at least one low frequency spectrum of with a greatest magnitude of oscillations. In some embodiments, each of first and second controllers 140a and 140b identifies the single low frequency spectrum that has the greatest magnitude of oscillations, regardless of whether both of the loads driven by the hybrid asynchronous induction machine to which the controller is connected are producing some unwanted low-frequency oscillations. In some embodiments, each of first and second controllers 140a and 140b determine, for each output port being driven by the hybrid asynchronous induction machine to which the controller is connected, the largest low frequency spectrum in the current load at each port.

Based on the determination of one or more low frequency spectra having the greatest magnitude of oscillations, each of first and second controllers 140a and 140b determine the waveform parameters (for example, frequency, phase and magnitude) of one or more compensation signals to be provided to the hybrid asynchronous induction machine to which each controller is connected.

Having determined the relevant waveform parameters, including, without limitation, being approximately 180 degrees out of phase from the one or more determined low frequency spectra, each of first and second controllers 140a and 140b cause at least one AC excitation source to generate at least one compensation signal, wherein each of the at least one compensation signals is provided on a generation side of the hybrid asynchronous induction machine to which the controller is connected. As described with reference to FIG. 1, the one or more compensation signals can, without limitation, be provided to an injection source 145 disposed between the hybrid asynchronous induction machine and a reference signal source. Alternatively, or additionally, the one or more compensation signals can be provided directly to one or more stator ports of the hybrid asynchronous induction machine connected to an AC excitation source. Also, as described with reference to FIG. 1, in addition to causing a compensation signal to be provided to the generator side of the hybrid asynchronous induction machine to which it is connected, each of first controller 140a and second controller 140b can send a control signal to the induction machine's rotor exciter (for example, AC exciter 160 in FIG. 1) to modulate the electrical slip frequency of the induction machine.

FIG. 3 illustrates another example embodiment of a system 300 according to various embodiments of this disclosure. While system 300 is shown as comprising a single hybrid asynchronous induction machine 120 driving a single pulsed load 130, via a controlled rectifier 135 there is no requirement that embodiments be limited to just the architecture shown in the figure, and scaled embodiments with more than one induction machines, loads, primary AC generators and controllers are possible and within the contemplated scope of this disclosure.

Referring to the illustrative example of FIG. 3, in addition to being powered by a tertiary polyphase winding of the stator of hybrid asynchronous induction machine 120 (for example, as shown in FIG. 1), the AC excitation source, polyphase power amplifier 150 can also be separately driven by a dedicated power supply 170, such as a battery or auxiliary direct current (DC) bus. Depending on the system architecture, the power supply 165 for the AC excitation source to the rotor exciter 160 of hybrid asynchronous induction machine 120 can be a separate power supply than power supply 170, and can be galvanically isolated therefrom.

Additionally, or alternatively, a passive polyphase filter 175 can be disposed between motor drive 115 between motor drive 115 and hybrid asynchronous induction machine 120. As noted elsewhere in this disclosure, the waveform properties of the AC power and signal provided at the output port (for example, stator port S2 in FIG. 3) can include harmonics excited by components external to the power hybrid asynchronous induction machine 120. For example, controlled rectifier 135, which can comprise thyristors or insulated-gate bipolar transistors as power switches can excite odd harmonics.

FIG. 4 illustrates an example system 400 with multiple pulsed loads implementing a controller 140 for injecting compensation signals on the generation side of a hybrid asynchronous induction machine 120 to suppress low frequency electrical resonances, which left unchecked, may excite torsional oscillations or other unwanted mechanical vibrations in upstream apparatus (for example, primary AC generator 105) on the generation side of hybrid asynchronous induction machine 120. Referring to the illustrative example of FIG. 4, system 400 incorporates architectural elements from each of the systems shown in FIGS. 1-3. For example, system 400 incorporates a polyphase capacitive-inductive filter 175 disposed between motor drive 115 and hybrid asynchronous induction machine 120. Additionally, and similarly to the example system 300 of FIG. 3, both power amplifier 150 and rotor exciter 160 are powered via separate DC power sources 165 and 170.

Similar to system 200 in FIG. 2, in system 400, a first load 120e is powered by one of the output ports (in this case, the port designated S2 in the figure with voltage V2 and current I2) of hybrid asynchronous induction machine 120, while a second load 120f is powered by another output port (in this case the stator port designated S5 in the figure with voltage V5 and current I5) of the induction machine. The voltages V2 and V5 can be at the same level or different, and the respective currents I2 and I5 can be at the same level or different. The input data provided to controller 140 includes the power drawn (i.e., current×voltage) at both ports of hybrid asynchronous induction machine 120. Depending on embodiments, controller 140 determines one or more than one compensation signals to be provided on the generation side (for example, after amplifier 150 through the action of the current I3 into the tertiary winding connected to port S3 of hybrid asynchronous induction machine 120. In some embodiments, controller 140 can also send a compensation signal Ix to Slip Frequency Rotor Exciter 160 which modulates the slip frequency of current Ir. In embodiments where only one compensation signal is determined and provided, the compensation signal can be based on a single low frequency spectrum with the largest magnitude. In embodiments in which multiple compensation signals are determined and provided, the compensation signals may be based on the largest amplitude low frequency spectrum at each of the ports.

Figure 5:
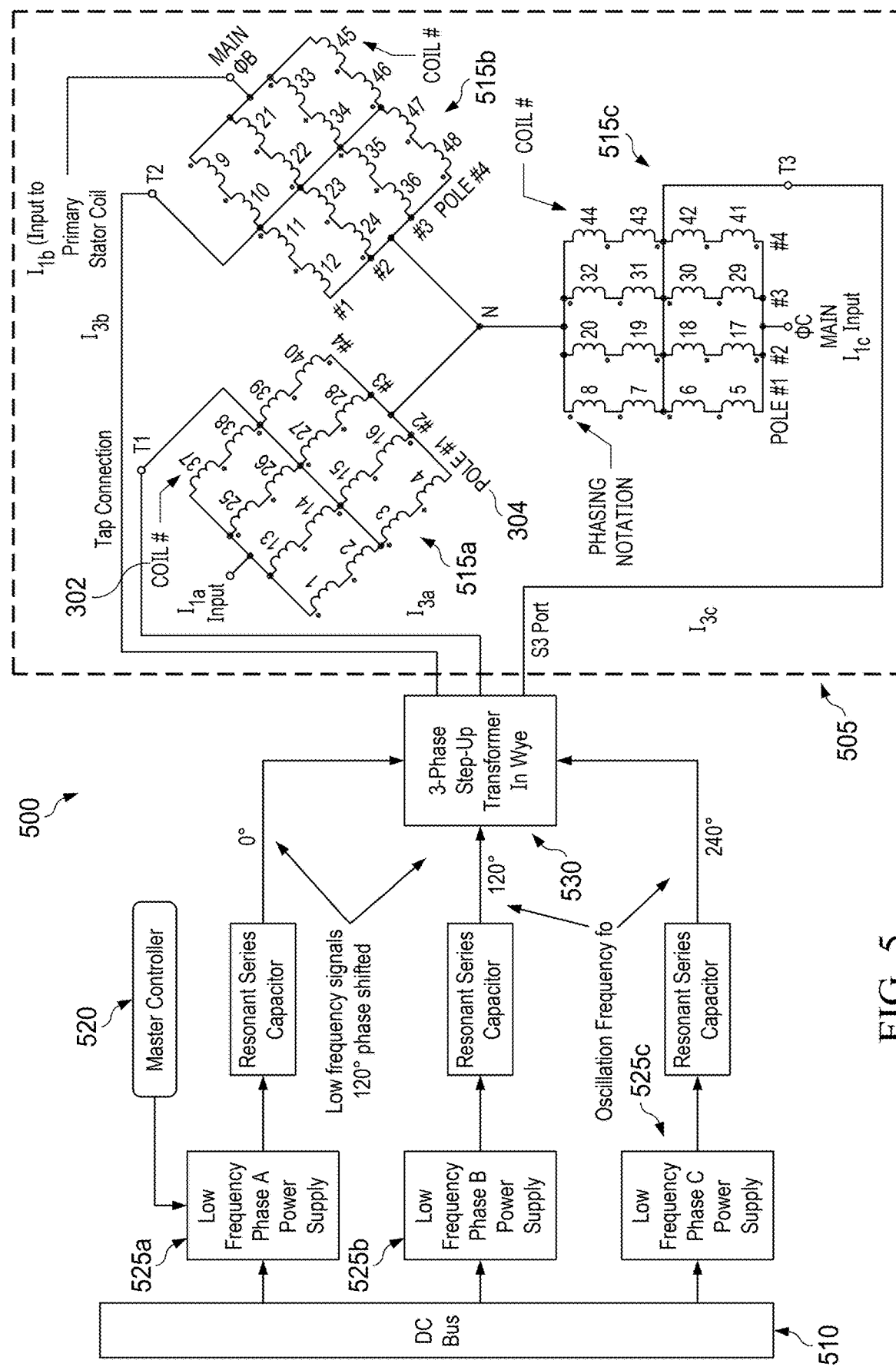
FIGS. 5 and 6 illustrate examples of hybrid asynchronous induction machines according to this disclosure.

FIG. 5 illustrates aspects of an architecture 500 of an example hybrid asynchronous induction machine (for example, hybrid asynchronous induction machine 120) according to various embodiments of this disclosure. Specifically, FIG. 5 illustrates parts of an example hardware architecture for introducing polyphase AC compensation signals at a tap point in the stator winding of a hybrid asynchronous induction machine to suppress low frequency resonances. Additionally, FIG. 5 shows how the compensation signal can be injected at a tap connection.

Referring to the illustrative example of FIG. 5, architecture 500 comprises a stator, which comprises a plurality of windings, including, at a minimum, a primary winding 505, through which an AC input signal from the generator side is provided to polyphase AC inputs as currents $I_{1a}$, $I_{1b}$ and $I_{1c}$ to the phase windings shown as 515a, 515b and 515c in the figure. Compensation signals for suppressing low-frequency resonances can be introduced at the tap points shown in the figure as T1, T2 and T3 to mix with generation side input current in the common windings.

As shown in FIG. 5, in embodiments where the hybrid asynchronous induction machine receives and outputs 3-phase input and output AC currents, primary winding 505 is divided into three separate phase windings 515a, 515b and 515c. Each of phase windings 515a, 515b and 515c include a tap at the center of the winding through which each phase of an AC compensation signal can be received. As shown in the figure, a stabilizer controller 520 (for example, controller 140 in FIG. 1) controls the power supplied by power source 510 to primary winding 505 through a first phase power supply 525a, a second phase power supply 525b and a third phase power supply 525c. These power supplies convert DC to variable-frequency AC at a controllable phase angle. The power supplied through each of first through third phase power supplies 525a-c and associated resonant series capacitor and transformer 530 comprise a compensation signal whose waveform parameters are determined by controller 520.

Each of first through third phase power supplies 525a-c can be connected by through a series resonant capacitor to form a bandpass filter then connected to an injection source 530 (for example, injection source 145 in FIG. 1). In some embodiments, injection source 530 is a three-phase step up transformer in a Wye configuration, which offers impedance transformation. However, other wiring configurations, for the stator windings, including Delta-Wye and Delta configurations, are possible and within the contemplated scope of this disclosure.

Figure 6:
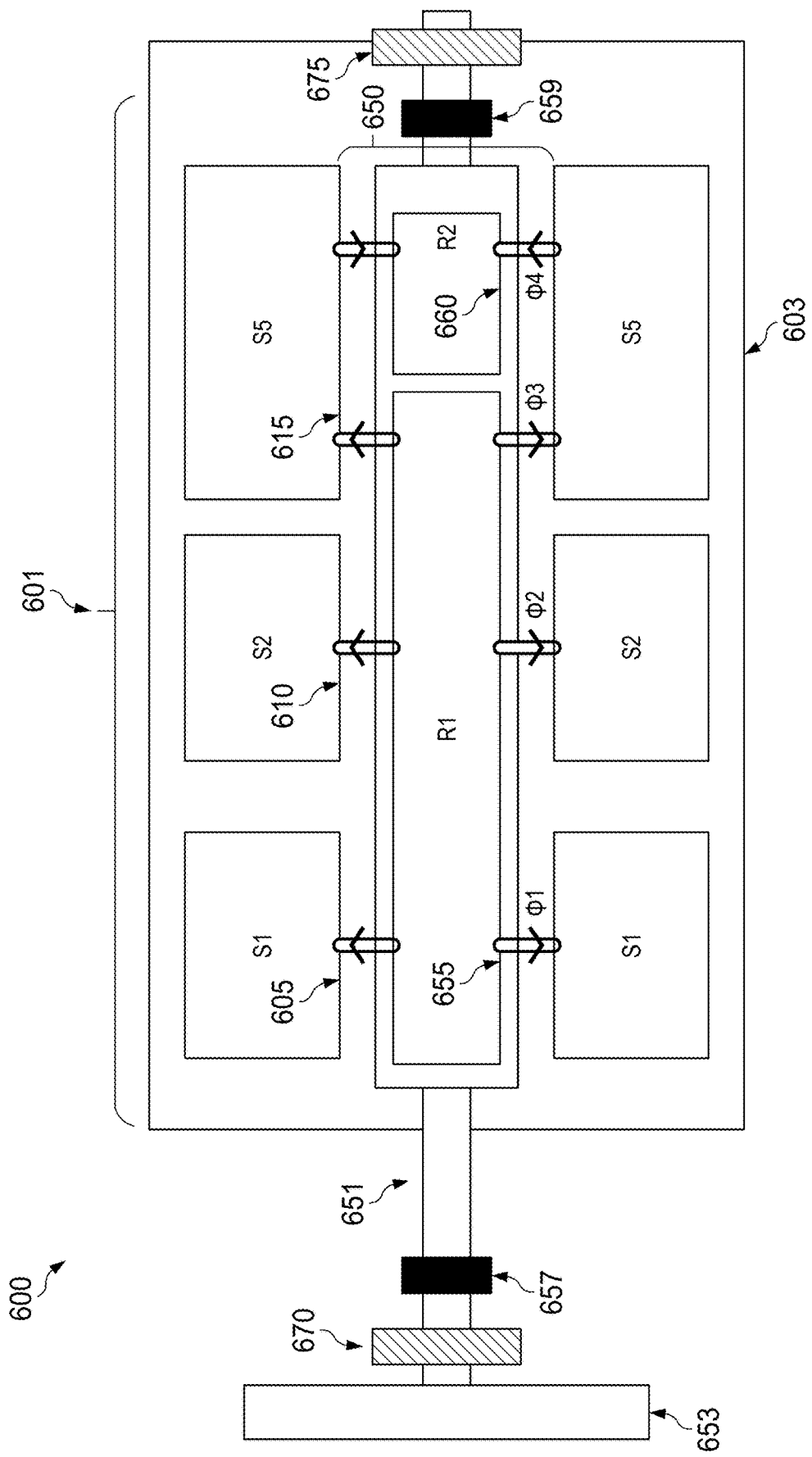

FIG. 6 illustrates structural aspects of an example hybrid asynchronous induction machine 600 according to various embodiments of this disclosure. The example hybrid asynchronous induction machine 600 can function as one or more of the hybrid asynchronous induction machines shown in systems 100-400 in FIGS. 1-4.

Referring to the illustrative example of FIG. 6, hybrid asynchronous induction machine 600 comprises a stator 601, with three axially distributed windings on a common housing or frame 603. Flywheel 653 and shaft 651 can be supported by bearings 670 and 675. First winding 605 is an input winding, from which the hybrid asynchronous induction machine receives AC power and a reference signal from power conditioning apparatus (for example, motor drive 115 and/or polyphase filter 175) driven by one or more primary AC generators (for example, primary AC generator 105). In some embodiments, AC power is injected into first winding 605 (which can be a polyphase winding) by a variable-frequency, variable-voltage motor drive to regulate an airgap magnetic flux constant for providing motive power. In this example, first winding 605 is configured in wye, as a distributed double-layer winding, though other configurations are possible and within the contemplated scope of this disclosure. As discussed with reference to FIG. 5, compensation signals determined by a controller connected to hybrid asynchronous induction machine 600 (for example, controller 140 in FIG. 1) can be injected through stator ports leading to taps in the phase windings of first winding 605, for example, taps T1, T2, and T3 in FIG. 5.

Stator 601 further comprises a first output winding 610, which provides a first polyphase AC output power and signal induced by the rotation of rotor 650 through the magnetic field within stator 601. In this explanatory example, phase windings of first output winding 610 are configured in delta, rather than wye. Additionally, stator 601 can include a secondary output winding 615, which analogously to primary output winding 610, provides a second polyphase AC output power and signal induced by the rotation of rotor 650 through the magnetic field within stator 601. Again, in this example, the phase windings of second output winding are configured in delta, rather than wye, but other embodiments are possible and within the contemplated scope of this disclosure. Secondary output winding 615 can be at a higher or lower impedance level than first output winding 610, and of a different electrical time constant.

Hybrid asynchronous induction machine 600 further comprises a rotor 650, which has a shaft 651, which is supported by bearings 670 and 675, and which rotates along an axis disposed centrally relative to first winding 605, first output winding 610 and second output winding 615. Winding 615 is provided to provide additional (and, in many embodiments) greater amplification of the compensation signal than winding 610. In this example, shaft 651 rotates at a specified speed, $\omega$. Flywheel 653 of an energy storage unit (for example ESU 125 in FIG. 1) is connected to shaft 651 and provides a reserve of kinetic energy and inertia which buffers the rate of rotation $\Delta\omega$ of shaft 651 against changes in rotational resistance due to abrupt variations in the current drawn through one or both of output windings 610 and 615. Rotor 650 further comprises a primary rotor winding 655, which comprises an equivalent number of magnetic poles as each of first output winding 610 and second output winding 615. In this example, the phase windings of primary rotor winding 655 are magnetically isolated from tertiary rotor winding 660. In the absence of any permanent magnetism of rotor 650, to ensure the operation of hybrid asynchronous induction machine 600, rotor winding 655 receives an AC excitation current (for example, from AC rotor exciter 160 in FIG. 1) through first slip rings 657 to create a primary revolving magnetic field in airgaps of the hybrid asynchronous induction machine 600.

In this example, rotor 650 can further include a tertiary winding 660, which has a shorter active length than rotor winding 655, and can be bidirectional in power flow, meaning that it can both receive or output power. Rotor winding 655 sets up three radially-oriented airgap magnetic fluxes (designated herein as $\Phi 1$, $\Phi 2$, and $\Phi 3$). Flux $\Phi 1$ magnetizes stator 605 which is typically the motoring or primary winding. Flux $\Phi 2$ magnetizes stator 610 which is the first output winding with current I2. Flux $\Phi 3$ magnetizes stator 615 which is the second output winding with output current I5 producing magneto-motive force MMF-5. An important aspect of the invention is that medium-level load current I5 and corresponding MMF-5 in winding 615 magnetizes tertiary winding 660 through radial airgap flux $\Phi 4$ and produces higher level power output at tertiary winding 660 of current I6 to feed a tertiary load. The greater the load current I5, the greater is the exciting MMF-5 which magnetizes tertiary winding 660 at flux $\Phi 4$ with an amplification factor of at least 50:1, that is $I6 \geq 50 \times I5$. The power developed by tertiary winding 660 is feed through polyphase slip rings 659 and contact brushes to a tertiary load, which may be a pulsed or steady state load. In addition to a current multiplication, the power output of 660 can be substantially greater than the output of output windings 610 or 615 due to an amplification effect. Thereafter the tertiary output as AC may be rectified for a pulsed DC load. In this arrangement, the singular machine has three distinct, galvanically isolated and separate output levels yet overall excitation and machine response is controlled by one main input current Ir to winding 655. In some embodiments, one or compensation signals whose waveform parameters are determined by a controller (for example, controller 140), can be injected into tertiary winding 660 via slip ring(s) 659 to mix a compensation frequency fo with fundamental frequency of tertiary winding 660.

Figure 7:
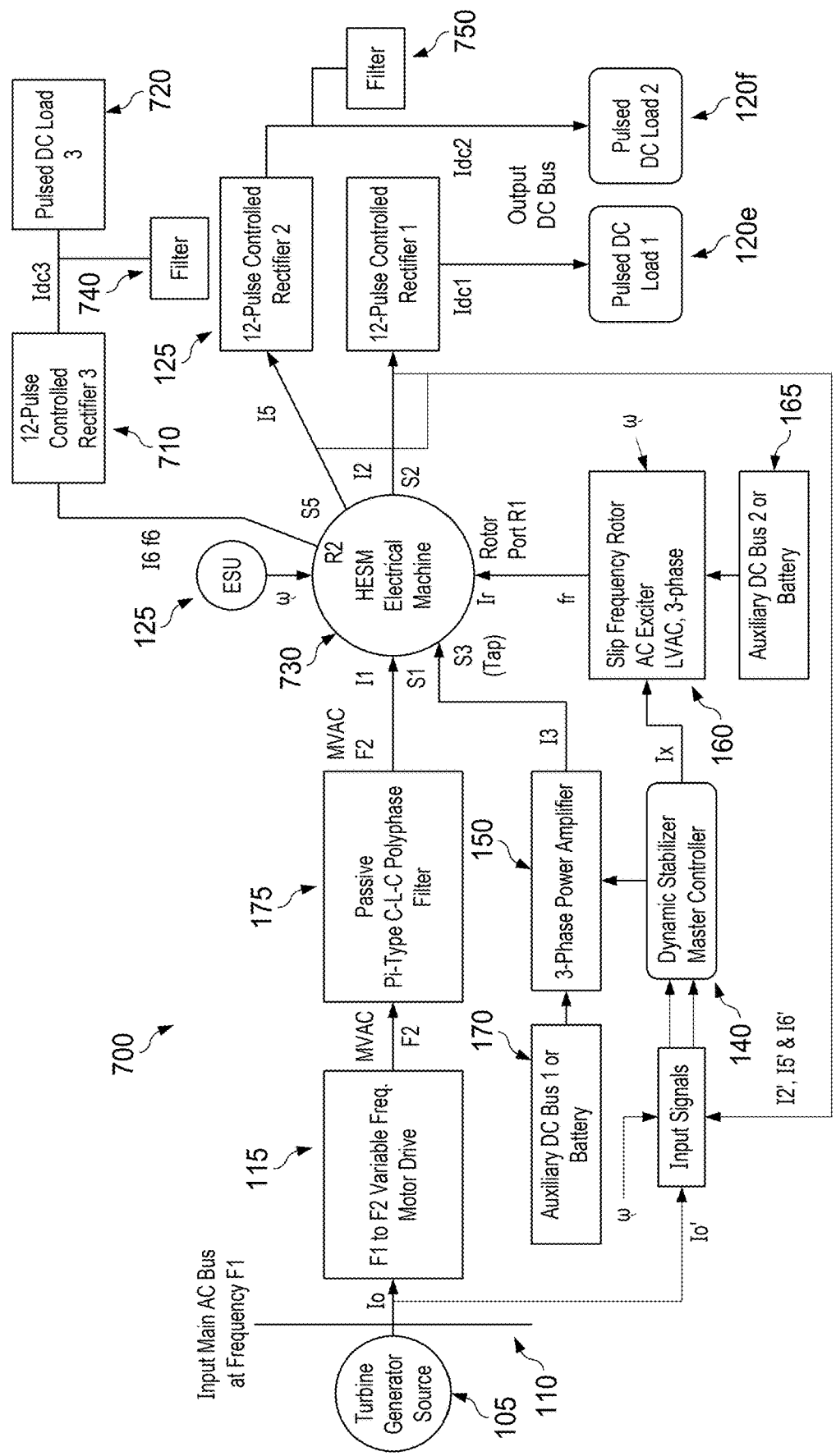
FIG. 7 illustrates an example system utilizing dynamic stabilizing of a hybrid asynchronous induction machine.

FIG. 7 illustrates an example system 700 implementing a controller 140 for injecting compensation signals on the generation side of a hybrid asynchronous induction machine 730 according to embodiments of this disclosure. Example system 700 extends the architecture of system 400 in FIG. 4 to include with three pulsed loads each of which may be at a different voltage, current and power level. Alternatively, one load in example system 700 can be a steady-state or continuous load, and the other two loads can be pulsed or otherwise stochastic in their duty cycles. For convenience of cross-reference, elements of FIG. 7 common to any of FIGS. 1-4 are numbered similarly. Hybrid asynchronous induction machine 730 is a hybrid asynchronous induction machine which embodies a winding structure (such as described with reference to FIG. 6) to include a tertiary rotor winding 660 configured to withdraw high power at current I6 through the slip rings at port R2. The output frequency F6 at the rotor terminal port R2 can be the same frequency as the main slip frequency fr at port R1. Alternatively, output frequency F6 can be a higher frequency than slip frequency fr by increasing the number of poles on the tertiary winding 660. The advantage of increasing frequency of the R2 output is the rectifier filter 740 is reduced in size and weight. In this explanatory example, output power from port R2 is rectified by a 12-pulse controlled rectifier 710, converted to direct current Idc3 which then feeds pulsed DC load 720. In a preferred embodiment, the peak power level of pulsed load 3 exceeds that of pulsed load 2 which exceeds power level of pulsed load 1.

Figure 8:
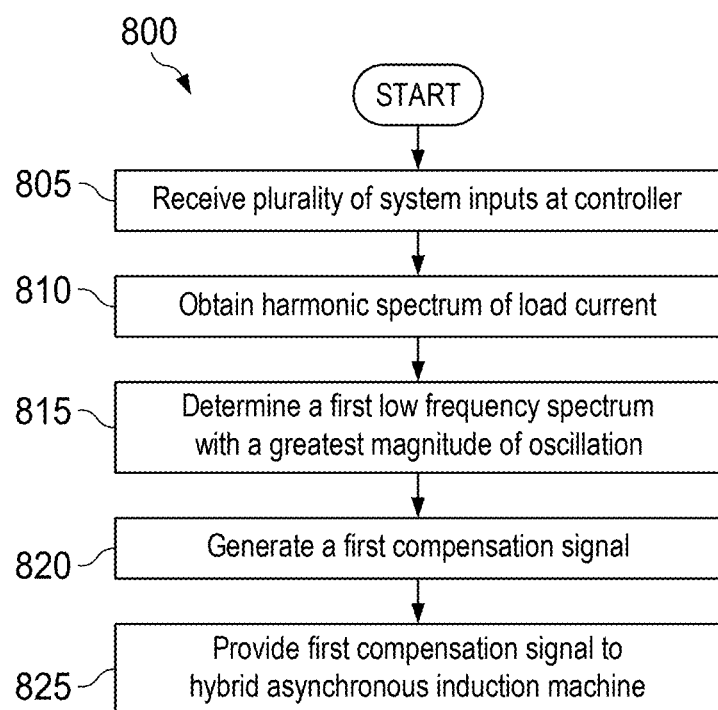
FIG. 8 illustrates an example method for dynamically stabilizing a hybrid asynchronous induction machine according to this disclosure.

FIG. 8 illustrates operations of an example method 800 for dynamically stabilizing a power supply in an AC power system (for example, any of systems 100, 200, 300, 400 and 700 in FIG. 1-4 or 7) by providing one or more compensation signals to cancel out low-frequency resonances in a hybrid asynchronous induction machine (for example, hybrid asynchronous induction machine 120 in FIG. 1, or hybrid asynchronous induction machine 600 in FIG. 6) driving one or more highly and abruptly variable electrical loads.

At operation 805, a controller (for example, controller 140 in FIG. 1) receives a plurality of values of system inputs of from a power system connected to the hybrid asynchronous induction machine. The inputs received at operation 805 include, without limitation, a value of an electric frequency on a main bus (for example, main bus 110 in FIG. 1) connected to a primary AC generator (for example, primary AC generator 105 in FIG. 1). The inputs received at operation 805 can include a value of an electrical frequency at an output port (for example, a port connected to one or both of primary output winding 610 and secondary output winding 615 in FIG. 6). At operation 805, the controller can also receive as a system input, a value of the shaft speed of a flywheel of an energy storage unit ("ESU") (for example, flywheel 653 or ESU 125 in FIG. 1). The value of shaft speed of the flywheel is an indicator of the amount of kinetic energy or inertia which can buffer the operation of the hybrid asynchronous induction machine against abrupt changes in the magnetic field within the hybrid asynchronous induction machine due to fluctuations in a load current drawn at one or both output ports. In this way, the electrical loads on apparatus on the generation side (for example, primary AC generator 105) are generally buffered against the fluctuations in the loads drawn at the stator output ports of the hybrid asynchronous induction machine.

The system inputs obtained by the controller at operation 805 can further include the input power to the hybrid asynchronous induction machine. Depending on embodiments, this power can be measured at a port for the input power winding of the stator (for example, a port of first winding 605 in FIG. 6), or at an upstream component (for example, injection source 145 in FIG. 1 or injection source 530 in FIG. 5). Additionally, the system inputs obtained by the controller at operation 805 can also include a value of the output power and rate of change of the output power at the one or more output ports of the hybrid asynchronous induction machine.

At operation 810, the controller obtains, based on the plurality of system inputs, a harmonic spectrum of the load current being drawn at the one or more output ports of the hybrid asynchronous induction machine. In some embodiments, obtaining the harmonic spectrum comprises one or more Fast Fourier Transforms of both voltage and current waveforms.

At operation 815, the controller determines, based on the harmonic spectrum, a first low frequency spectrum with the greatest magnitude of oscillation. In practical terms, at operation 815, the controller identifies the largest low frequency spectrum which, if allowed to persist, could induce unwanted torsional oscillations or other induced vibrations in apparatus on the generation side of the hybrid asynchronous induction machine. As described, for example, with reference to FIGS. 2 and 4 of this disclosure, method 800 is eminently scalable, and multiple target low frequency spectra can be identified at operation 715.

At operation 820, the controller causes an AC excitation source (for example, power amplifier 150 in FIG. 1) to generate a first compensation signal. The waveform parameters (phase, amplitude and frequency) of the first compensation signal are determined by the controller based on the plurality of system inputs, and are designed to generate a signal that, by the principle of superposition, cancels out the low frequency spectrum determined at 615. Thus, at a minimum, the first compensation signal is 180 degrees out of phase with the low frequency spectrum determined at operation 815. In this way, electrical resonances in the hybrid asynchronous induction machine at frequencies below what can reliably be suppressed by either the action of the flywheel and modulating slip frequencies or by using high-pass filters and other passive techniques, can be suppressed before inducing low frequency oscillations at upstream apparatus.

At operation 825, the first compensation signal is provided to the hybrid asynchronous induction machine. As discussed in the example embodiments described herein, the architecture of hybrid asynchronous induction machines according to certain embodiments of this disclosure permits a variety of options for where to inject the compensation signal, including, without limitation, directly into a port of the stator input winding, directly into a tertiary winding of the rotor, indirectly, through a transformer on the generation side, or through an AC slip frequency rotor exciter (for example, AC rotor exciter 160 in FIG. 1).

Although FIG. 8 illustrates one example of a method 800 for dynamically stabilizing a power supply, other embodiments are possible and within the contemplated scope of this disclosure. For example, while shown as a series of steps, various steps in FIG. 8 may overlap, occur in parallel, occur in a different order, or occur any number of times (including zero times). Method 800 can, as illustrated by the examples of FIGS. 1 through 4 and 7, be extended, scaled, and modified.

Figure 9A:
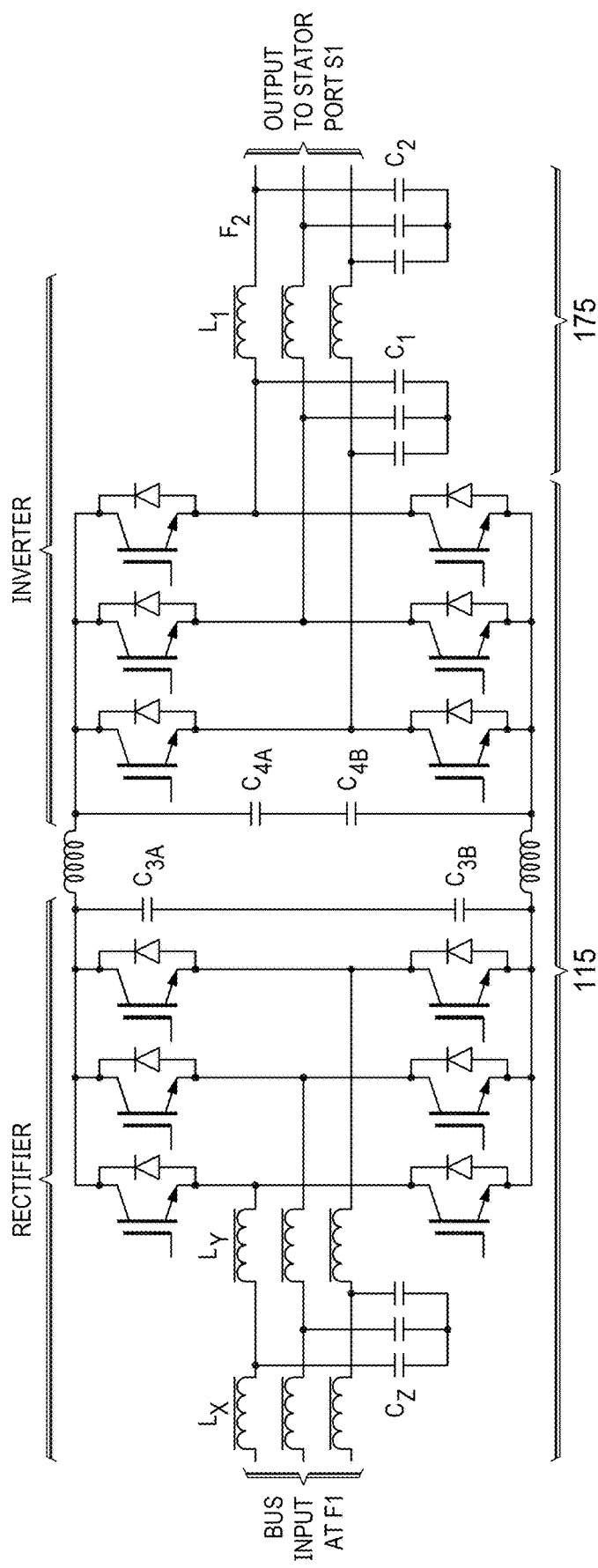
FIGS. 9A-9C illustrate example circuit architectures for certain components shown in FIGS. 1-4 and 7, according to this disclosure.
Figure 9B:
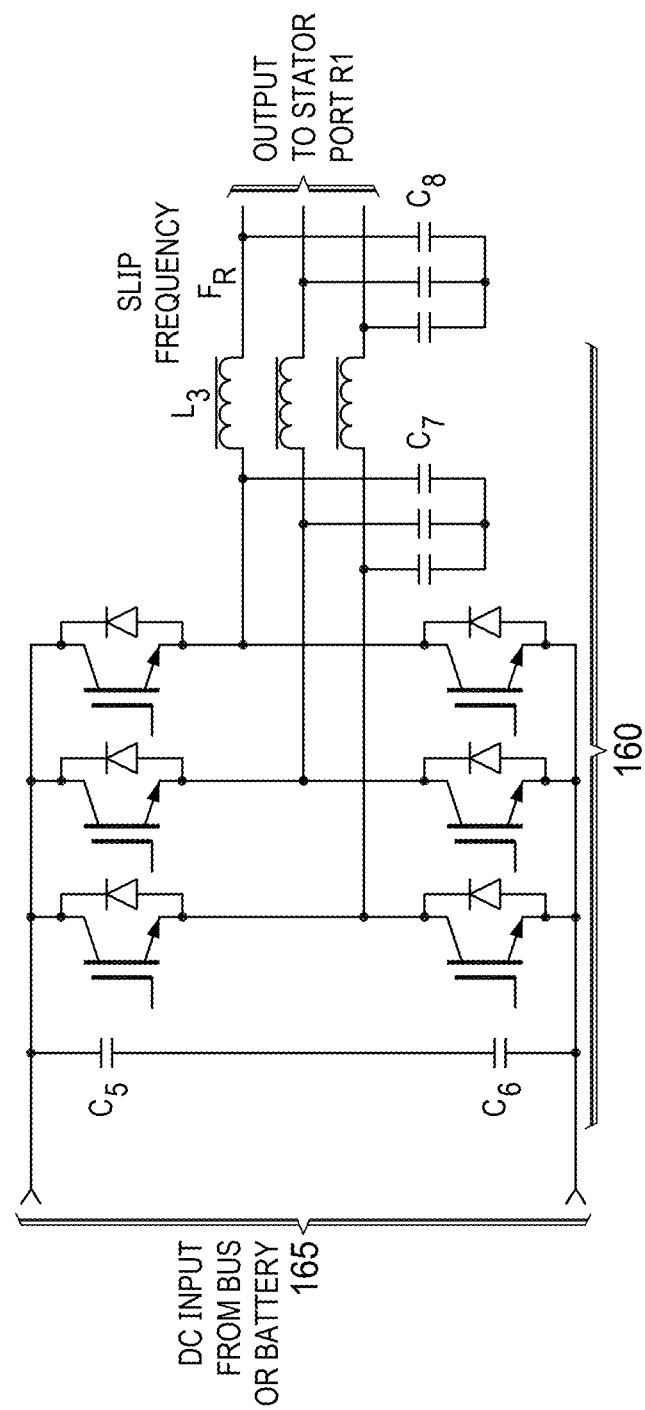
Figure 9C:
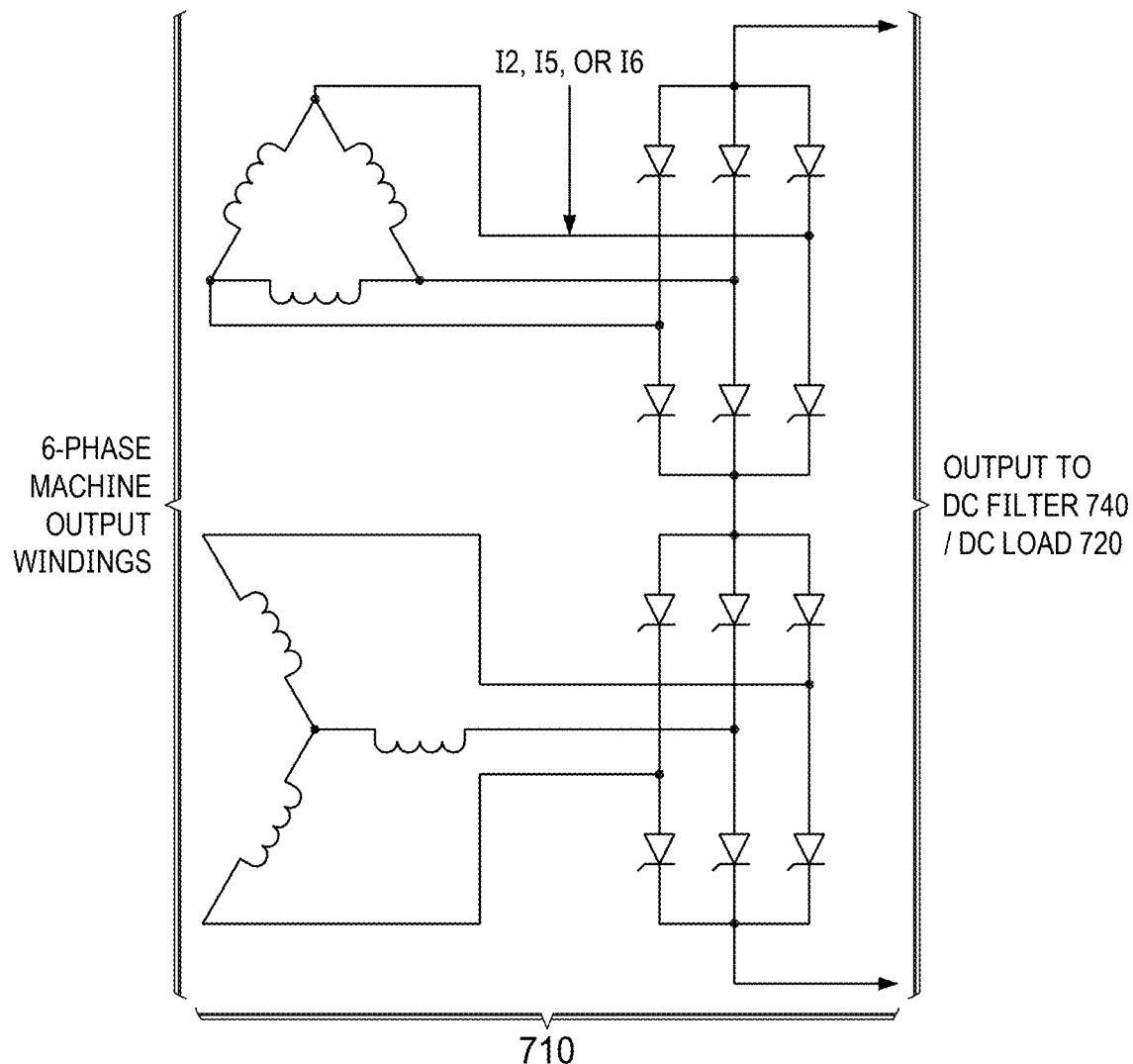

FIGS. 9A through 9C illustrate, example circuit architectures for certain components of the systems described with reference to FIGS. 1-4 and 7. For convenience of cross-reference, elements common to one or more figures are numbered similarly.

Referring to FIG. 9A, an example circuit for motor drive 115 and polyphase capacitive-inductive filter 175 is shown in the figure. As shown in the figure, in some embodiments, each phase of a three-phase input signal at frequency F1 from a main bus powered by a turbine or other primary AC generator (for example, primary AC generator 105) is fed an LCL filter of a rectifier stage, and then passed through a first switching network to obtain DC power, which is then fed to an inverter comprising second switching network, which are in turn, fed to passive capacitive-inductive filter 175 to obtain a three-phase power and signal at a new frequency, F2, which can be fed to the primary stator port S1 of hybrid asynchronous induction machine 120 (in FIGS. 1-4) or hybrid asynchronous induction machine 730 in FIG. 7.

Referring to FIG. 9B, an example circuit for slip frequency rotor exciter 160 is shown in the figure. As shown in the figure, a DC power is provided (for example, from an auxiliary DC bus or battery at the positive and negative terminals of a power semiconductor switching network to generate a three-phased output, which is in turn, passed to a three-phase CLC filter to obtain a three-phase AC output power and signal at slip frequency fr, which can be output to a port R1 for the primary winding of the rotor of a hybrid asynchronous induction machine (for example, hybrid asynchronous induction machines 120 or 730).

Referring to FIG. 9C, an example circuit for a 12-phase AC to DC rectifier (for example, rectifier 135 or rectifier in power supply 170) which provides an AC power output from a hybrid asynchronous induction machine to a pulsed load (for example, pulsed load 130 in FIG. 3) is shown in the figure. As shown in the figure, AC current from a stator output port (for example, any of ports S2, S5 or S6 in FIG. 6 or 7—shown in the figure as wye and delta machine windings) of a hybrid asynchronous induction machine is fed to a network of thyristors, from which a controlled DC current is obtained.

It should be noted that the circuits shown in FIGS. 9A-9C are for illustration only and are not limitative of components suitable for use in power networks comprising asynchronous hybrid induction machines according to this disclosure.

FIGS. 10A-10D are winding diagrams further illustrating the coil structure of the stator and rotor windings of a hybrid asynchronous induction machine (for example, hybrid asynchronous induction machine 600 in FIG. 6) according to this disclosure.

Figure 10A:
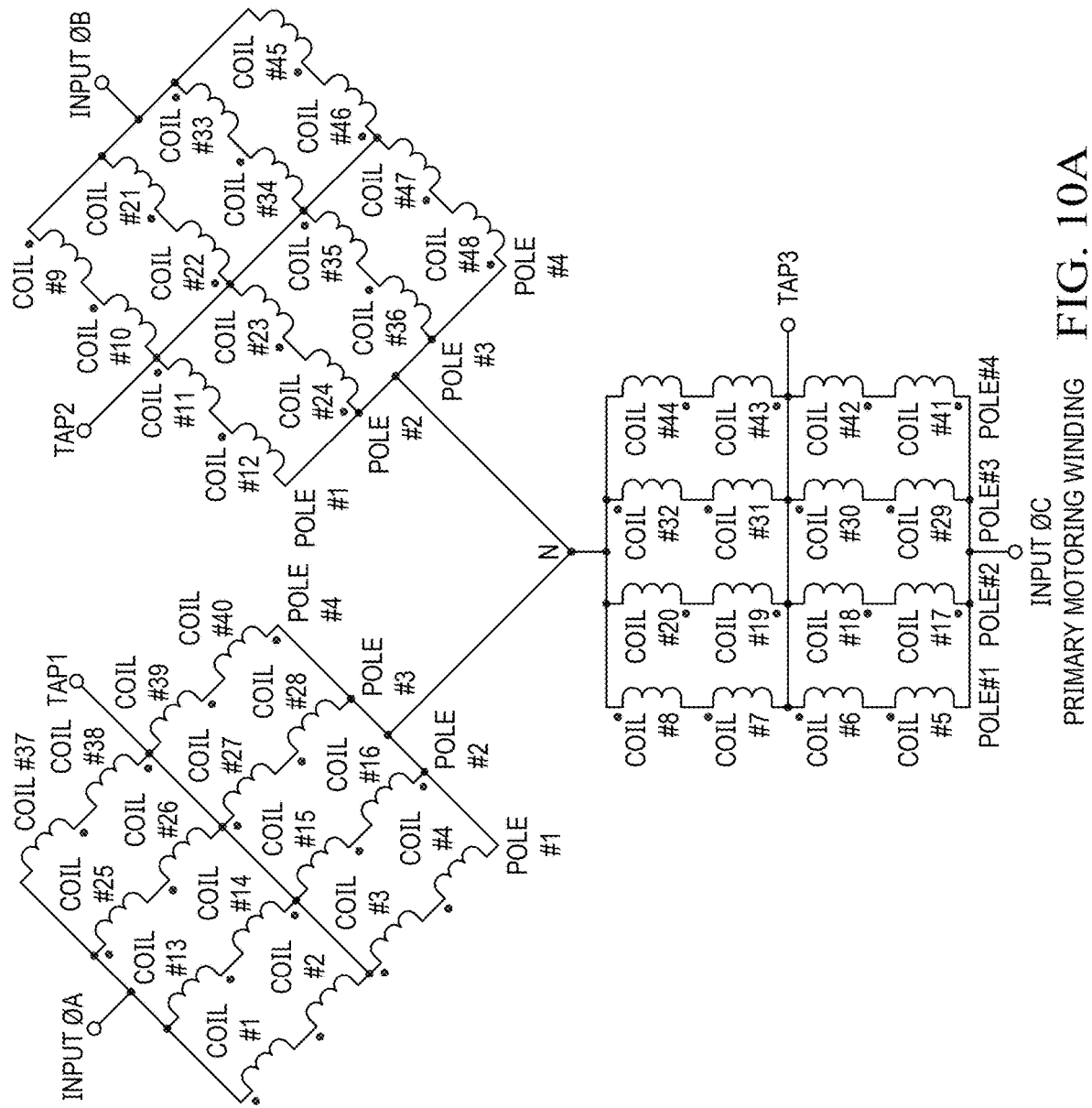
FIGS. 10A-10D comprise winding diagrams illustrating an example of stator windings of an asynchronous hybrid induction machine according to this disclosure.

Referring to the illustrative example of FIG. 10A, a winding diagram for a three-phase primary stator winding (for example, primary output winding 610 in FIG. 6) is shown in the figure. In this example, the primary stator winding comprises 48 coils wound in wye, wherein each phase winding comprises 16 coils and a single input port and a tap connection.

Figure 10B:
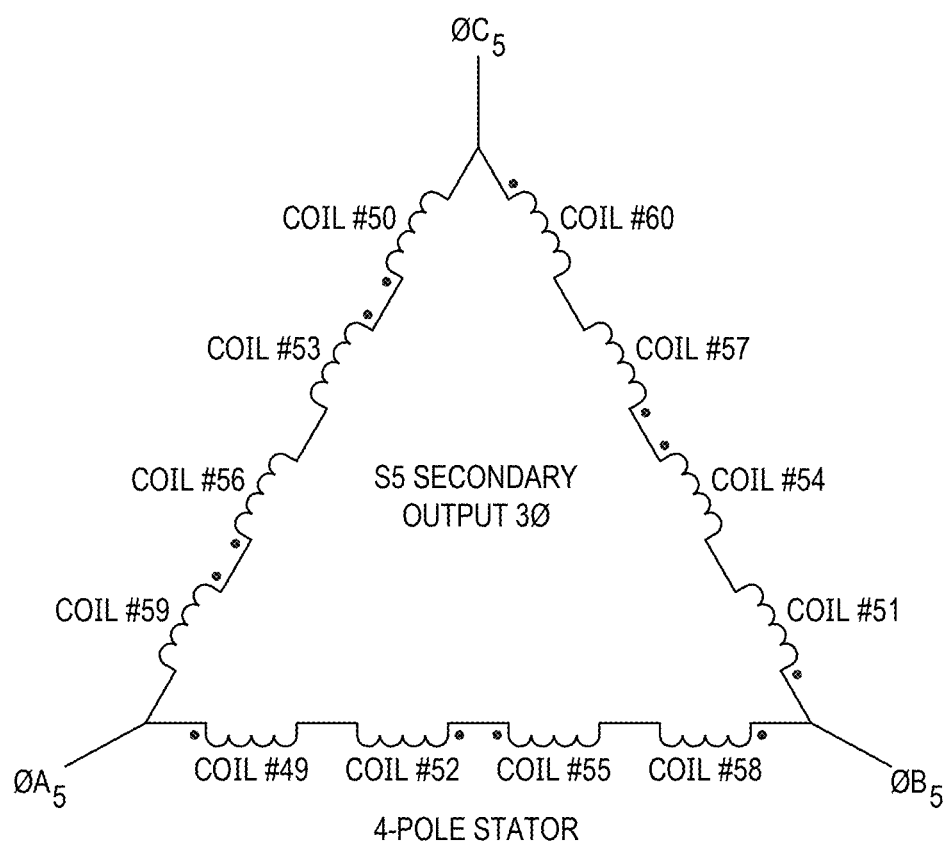

Referring to the illustrative example of FIG. 10B, a winding diagram for a secondary output winding of a machine having the primary stator winding shown in FIG. 10A (for example, secondary output winding 615 in FIG. 6) is shown in the figure. In this example, the phase windings each comprise four series connected coils connected in delta, which can provide the output shown in figures of this disclosure as S5.

Figure 10C:
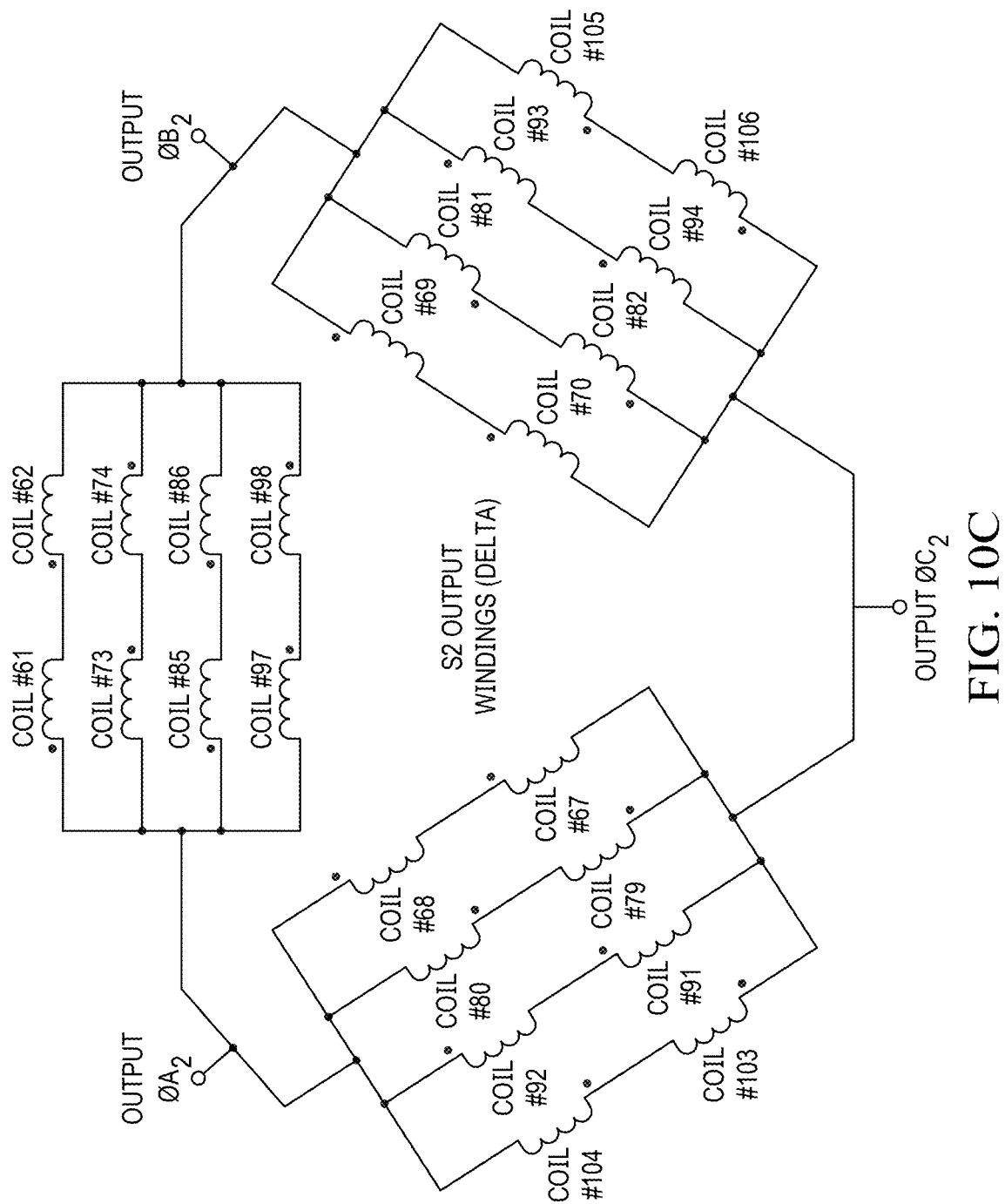
Figure 10D:
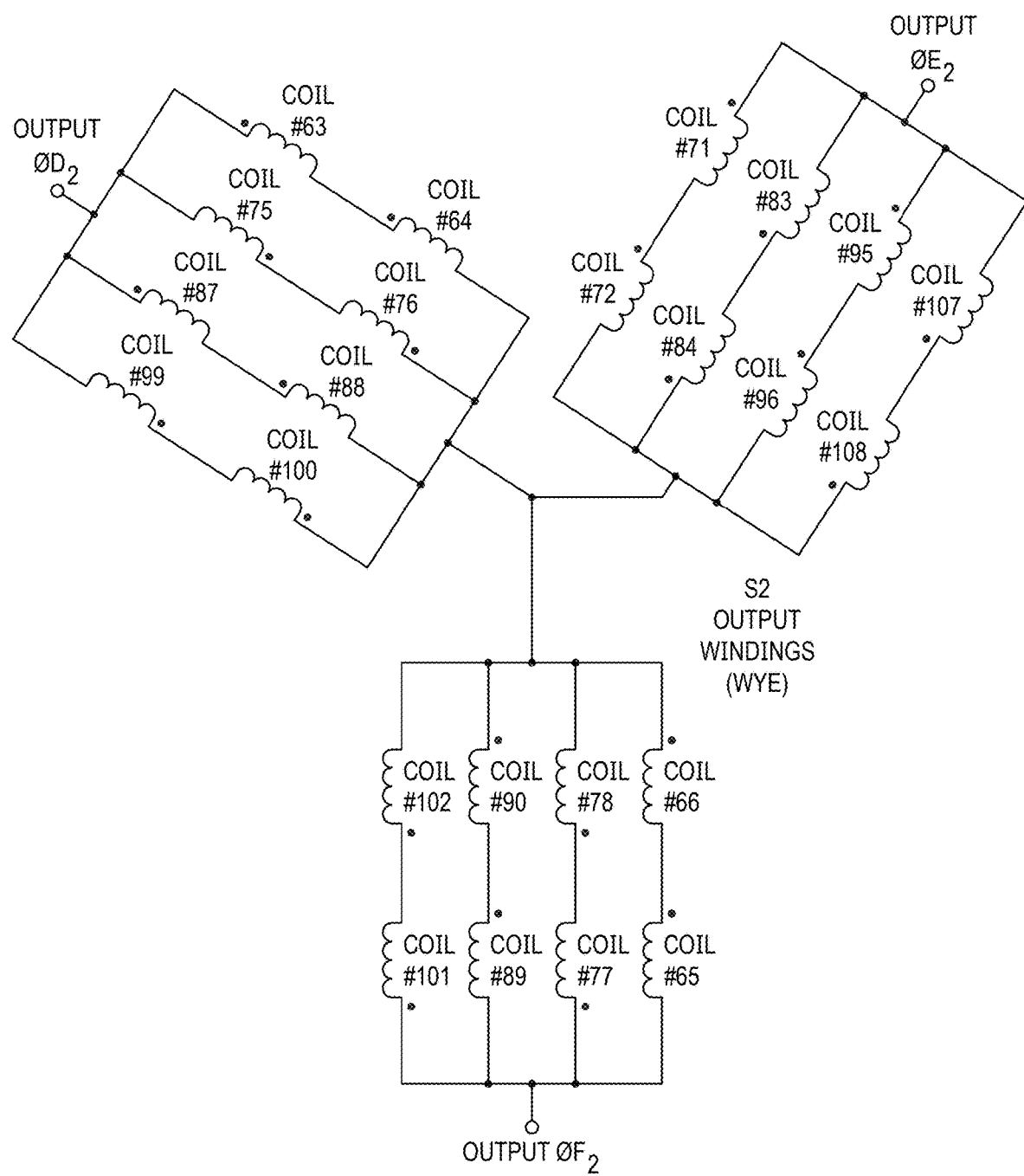

FIGS. 10C and 10D illustrate an example of a winding structure for a six-phase primary stator output winding S2

(for example, primary output winding 610 in FIG. 6) of the machine having the windings shown with reference to FIGS. 10A and 10B according to this disclosure. In embodiments in which the primary output winding comprises a six-phase winding, three of the phase windings are connected in delta, as shown in FIG. 10C, and three of the phase windings are connected in wye in FIG. 10D. Further, as shown in the explanatory example of FIGS. 10C and 10D, each of the phase windings can comprise 4 parallel groups of coils, wherein the coils can be wound in a double-layer distributed winding.

Figure 11A:
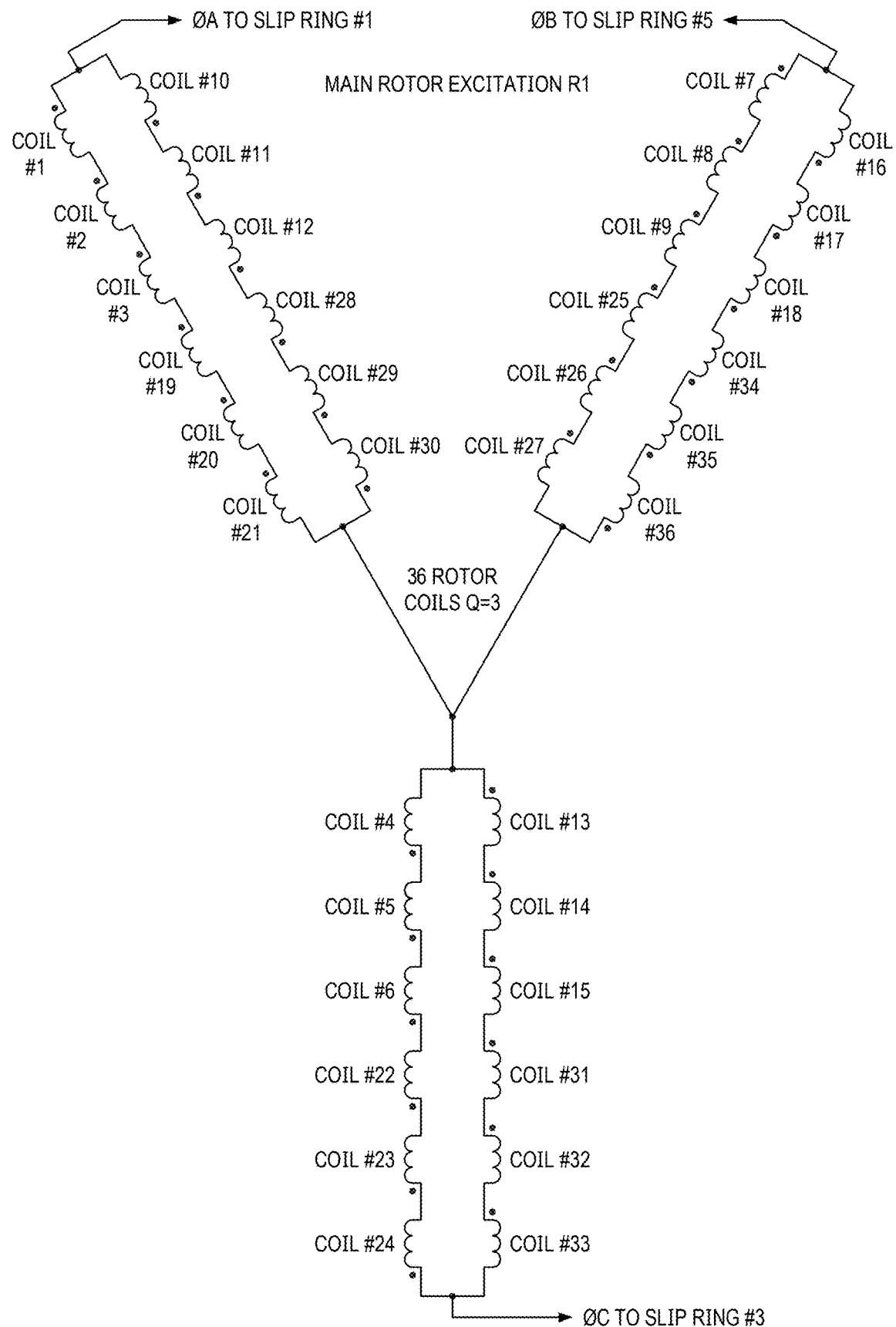
FIGS. 11A-11B comprise winding diagrams illustrating an example of rotor windings of an asynchronous hybrid induction machine according to this disclosure.
Figure 11B:
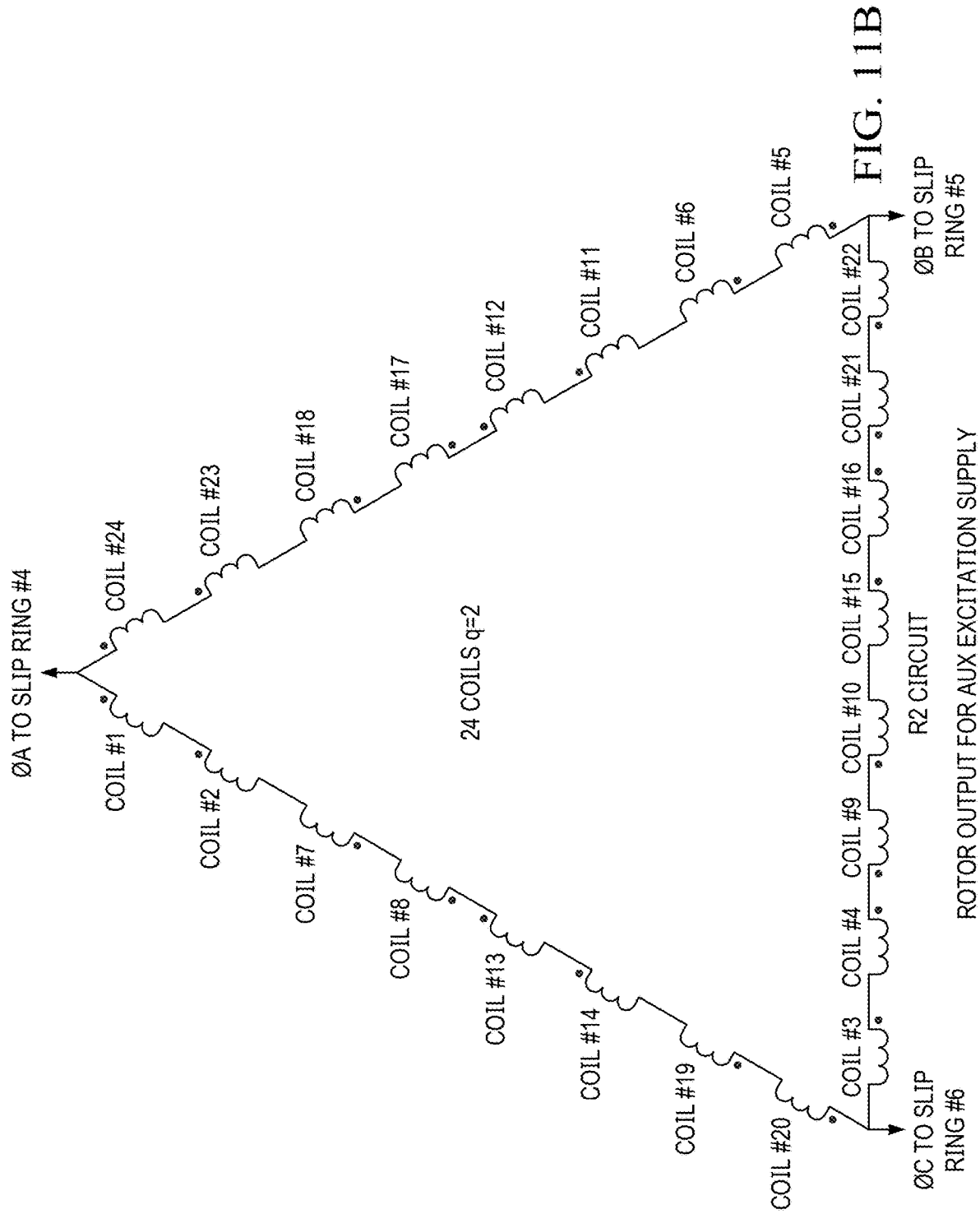

FIGS. 11A and 11B illustrate an example of a winding structure of a primary rotor (for example, rotor winding 655 in FIG. 6) and secondary rotor (for example, tertiary rotor winding 660 in FIG. 6) according to this disclosure. As shown in the illustrative example of FIG. 10A, in certain embodiments, the primary rotor, or main excitation rotor according to various embodiments is wound in wye with each phase winding comprising two parallel series of coils. As shown in the illustrative example of FIG. 11B, in certain embodiments, the secondary rotor, or auxiliary excitation rotor, can be wound in delta with each phase winding comprising a series of eight coils. By this configuration, and as further exemplified in FIG. 6, the two rotor windings can be galvanically and magnetically isolated yet disposed on a common mechanical shaft.

Figure 12:
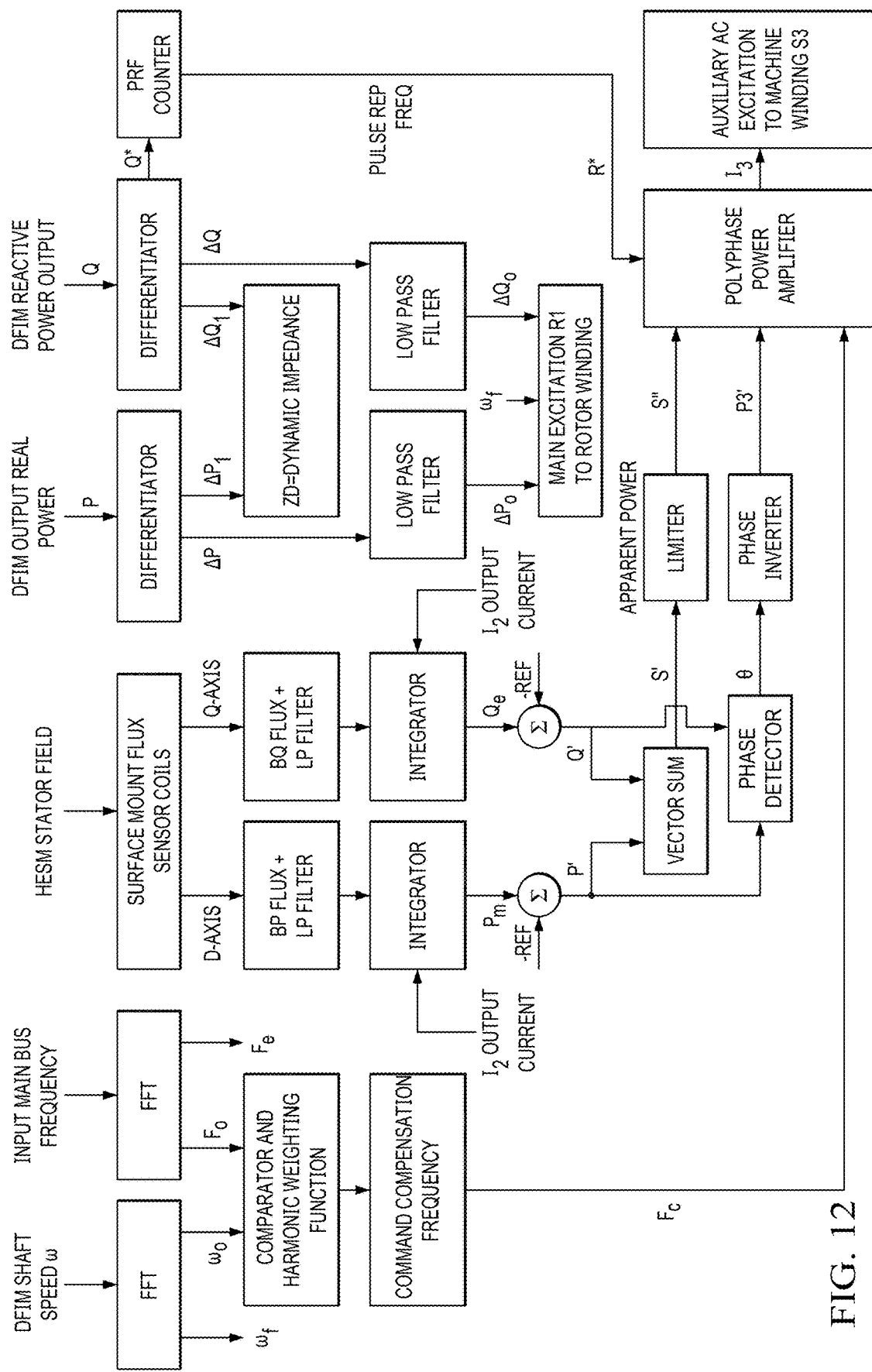
FIG. 12 illustrates a component and processing architecture for determining waveform properties of a compensation signal to be injected into a hybrid asynchronous induction machine according to this disclosure.

FIG. 12 illustrates elements of an example control architecture 1200 for determining the amplitude and waveform characteristics of a compensation signal to be provided to a hybrid asynchronous induction machine according to various embodiments of this disclosure. Control architecture 1200 can be implemented in a single control device (for example, controller 140) in conjunction with a single power amplifier (for example, amplifier 150). Alternatively, additional amplifiers/power sources (for example, slip frequency rotor exciter 160) can be used to implement architecture 1200. In some embodiments, the control logic can be implemented across multiple devices, and as a mixture of hardware and software. The example of FIG. 12 is intended for explanation only and should not be construed as limitative of the scope of this disclosure.

As noted elsewhere in this disclosure, the waveform characteristics of the control frequency can be derived from a combination of the frequency ($f_o$) of a main bus from a primary AC generator, a value of an electric frequency ($f_1$) at an output port of a stator of the hybrid asynchronous induction machine, a value of the shaft speed of an energy storage unit, a value of the input power to the hybrid asynchronous induction machine, and a value of the output power and its derivatives $\Delta P$ and $\Delta Q$. at a stator output port of the asynchronous induction machine. Additionally, and as discussed herein, the waveform parameters of the compensation signal can also be determined based on other controller input parameters, including, for example: (1) the voltage V2 of the AC current from the output stator port to the load; (2) the magnitude of the AC current I2 from the output stator port to the load; (3) the electrical output frequency F3 to the load; (4) the real electric power output from the output stator port to the load; (5) the reactive electric power of the hybrid asynchronous induction machine; and (6) the shaft speed $\omega$ of the ESU, which is, depending on the design, either the same as, or proportional to the shaft speed of the rotor of the hybrid asynchronous induction machine.

Referring to the illustrative example of FIG. 12, architecture 1200 has three main components, comprising a first component 1205, from which the frequency of the compensation signal(s) is determined, a second component 1235, from which the phasing of the compensation signal(s) is determined, and a third component 1265, which determines the power and repetition rate of the compensation signal(s). As shown in FIG. 12, the inputs to first component 1205 include the shaft speed $\omega$ of the ESU (which in many embodiments, such as shown in FIG. 6, is the same as the rotor speed of the asynchronous hybrid induction machine) and the frequency ($F_o$) on the main bus powered by a primary AC generator. As shown in FIG. 12, Fast Fourier Transforms are taken of each of $F_o$ and $\omega$, the outputs of which are then provided to a comparator and harmonic weighting function to obtain harmonic spectrum from which the frequency of the compensation signal(s) is determined.

In second component 1235, the phasing of the compensation signal can be determined based on real-time measurements of the magnetic flux in the air gap of the hybrid asynchronous induction machine along the direct and quadrature axes, which are low-pass filtered and the Bp and Bq flux signals are electrically integrated with the $I_2$ output current to produce real and reactive power signals P' and Q' the phase angle $\Theta$ between these quantities. The phase angle $\Theta$ of electromagnetic resonances within the hybrid asynchronous induction machine, are then passed to a phase inverter to determine the phasing of the compensation signal(s) for cancelling the resonances.

In third component 1265, the real output power at the stator port of the hybrid asynchronous induction machine powering the load is provided as an input, in concert with reactive power of the hybrid asynchronous induction machine are processed through a differentiator set to provide rates of change $\Delta P$ and $\Delta Q$ and provided as inputs. From the reactive power rate of change inputs, the pulse repetition frequency (PRF) of the load can be determined, and based on the power and pulse repetition frequency of the load exciting harmonics in the hybrid asynchronous induction machine and potentially also the primary AC generator, the magnitude and pulse frequency of the compensation signals can be determined. From the outputs of first component 1205, second component 1235 and third component 1265, the waveform parameters of the one or more compensation signals are provided to a power amplifier (for example, amplifier 150 in FIG. 1) which produces one or more compensation signals having the determined waveform characteristics, which are then provided to the hybrid asynchronous induction machine to mix with fundamental frequency power inputs. As noted elsewhere in this disclosure, the one or more compensation signals can be provided either at, or through components connected to a stator port of the hybrid asynchronous induction machine, or through an auxiliary winding (for example, tertiary winding 660 in FIG. 2) of the rotor.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A hybrid asynchronous induction machine, comprising:
   a stator housing,
   a stator disposed in the stator housing, the stator comprising:
   an input winding for a polyphase AC input signal, the input winding comprising a plurality of phase windings, wherein each phase winding of the input winding comprises a tap connected to a first auxiliary port for the input winding;
   a primary output winding for a first polyphase AC output signal, the primary output winding comprising phase windings in a higher or equal number as the plurality of phase windings of the input winding, wherein each phase winding of the primary output winding is connected to a second auxiliary port; and
   a secondary output winding for a second polyphase AC output signal, the secondary output winding comprising phase windings in a higher or equal number of phases as the plurality of phase windings of the input winding, wherein each phase winding of the secondary output winding is connected to a third auxiliary port; and
   a rotor having a shaft, and disposed to rotate within a magnetic field of the input winding, the primary output winding, and the secondary output winding, wherein the shaft is connected to a flywheel of an energy storage unit, the rotor comprising:
   a primary rotor winding for a polyphase AC excitation signal, the primary rotor winding comprising phase windings in a same number of poles as the plurality of phase windings of the input winding, wherein each phase winding of the primary rotor winding is connected to one or more primary slip rings of a current collector on the shaft; and
   a secondary rotor winding for bidirectional power flow, the secondary rotor winding comprising phase windings in a same or higher number of poles as the plurality of phase windings of the input winding, wherein each phase winding of the secondary rotor winding is connected to one or more secondary slip rings on the shaft,
   wherein the hybrid asynchronous induction machine is configured to receive a compensation signal for cancelling low-frequency electrical resonances.

2. The hybrid asynchronous induction machine of claim 1, wherein the flywheel of the energy storage unit is attached to the shaft.

3. The hybrid asynchronous induction machine of claim 1, wherein the phase windings of the input winding of the stator are configured in wye.

4. The hybrid asynchronous induction machine of claim 3, wherein the phase windings of the input winding of the stator comprise a plurality of individual coils in series, wherein the series of coils are configured in parallel.

5. The hybrid asynchronous induction machine of claim 1, wherein the phase windings of the secondary output winding comprise series of individual coils, wherein the series of individual coils are configured in delta.

6. The hybrid asynchronous induction machine of claim 1, wherein the phase windings of the primary rotor winding are configured in wye.

7. The hybrid asynchronous induction machine of claim 6, wherein the phase windings of the primary rotor winding comprise a plurality of parallel series of coils.

8. The hybrid asynchronous induction machine of claim 1, wherein the phase windings of the secondary rotor winding are configured in delta.

9. The hybrid asynchronous induction machine of claim 1, wherein the compensation signal is generated by an AC excitation source powered by at least one of a stator polyphase AC output signal or a polyphase output signal provided by the secondary rotor winding.

10. The hybrid asynchronous induction machine of claim 1, wherein the hybrid asynchronous induction machine is configured to receive the compensation signal through the first auxiliary port.

11. The hybrid asynchronous induction machine of claim 1, wherein the hybrid asynchronous induction machine is configured to receive the compensation signal through the second auxiliary port.

12. The hybrid asynchronous induction machine of claim 1, wherein the hybrid asynchronous induction machine is configured to receive the compensation signal through the third auxiliary port.

13. The hybrid asynchronous induction machine of claim 1, wherein the hybrid asynchronous induction machine is configured to receive the compensation signal through the one or more secondary slip rings.

14. The hybrid asynchronous induction machine of claim 1, wherein the primary rotor winding and the secondary rotor winding are mechanically and galvanically isolated from each other.

15. The hybrid asynchronous induction machine of claim 14, wherein the secondary rotor winding is magnetized and regulated by load current and magneto-motive force in the secondary output winding of the stator.

16. The hybrid asynchronous induction machine of claim 15, wherein the secondary rotor winding generates a polyphase power extracted through a slip-ring and brush assembly to power a tertiary load.

17. The hybrid asynchronous induction machine of claim 1, wherein the hybrid asynchronous induction machine is connected to and configured to power a plurality of pulsed loads.

18. The hybrid asynchronous induction machine of claim 17, wherein each of the plurality of pulsed loads has a unique power level, voltage, and pulse duty cycle.

19. The hybrid asynchronous induction machine of claim 1, further comprising a port configured to provide an AC power and current to a polyphase power amplifier.

20. The hybrid asynchronous induction machine of claim 1, wherein the hybrid asynchronous induction machine is a first hybrid asynchronous induction machine of a plurality of hybrid asynchronous induction machines connected to a common power bus.

\* \* \* \* \*